Figure 1:
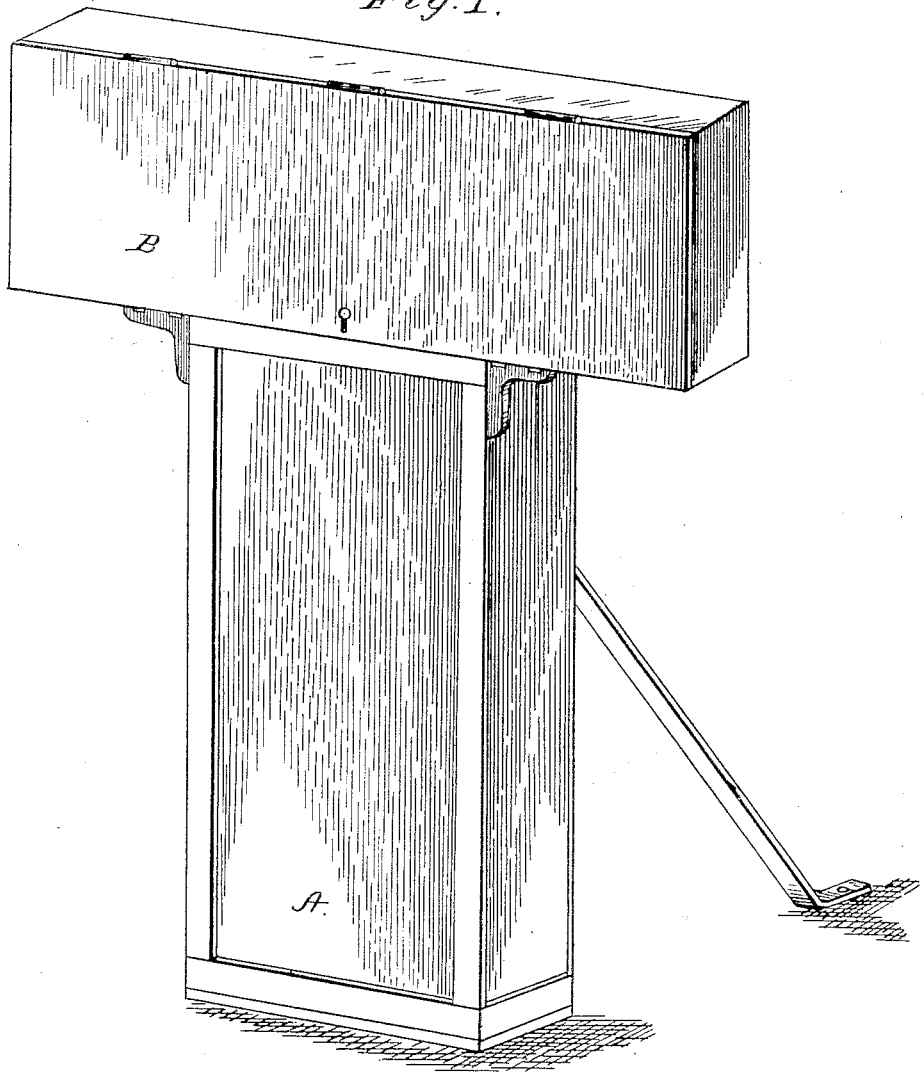

C. C. MOORE, Jr.
VOTING MACHINE.
APPLICATION FILED NOV. 16, 1907.

1,172,548.

Patented Feb. 22, 1916.
15 SHEETS—SHEET 1.

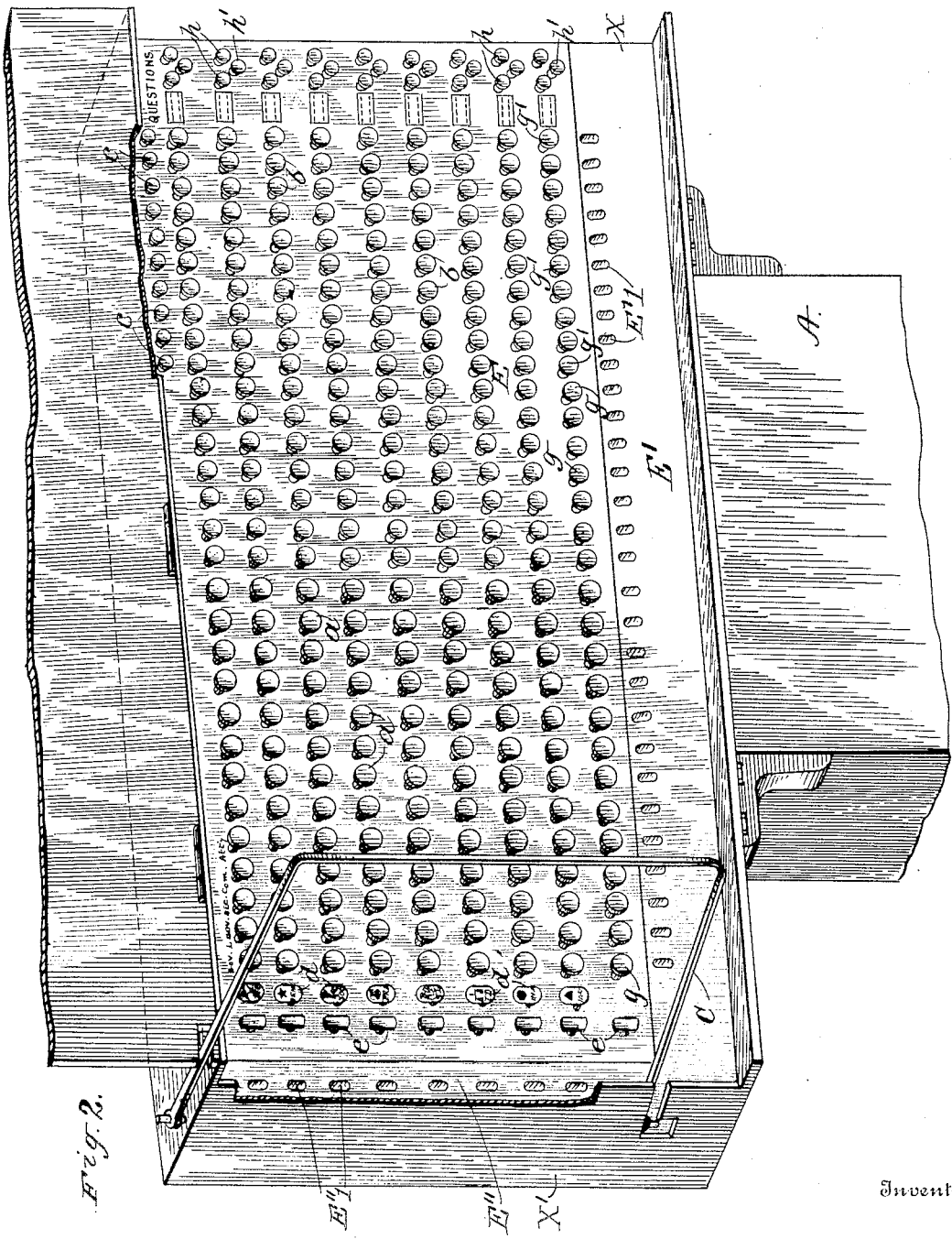

C. C. MOORE, Jr.
VOTING MACHINE.
APPLICATION FILED NOV. 16, 1907.
1,172,548.
Patented Feb. 22, 1916.
15 SHEETS—SHEET 3.
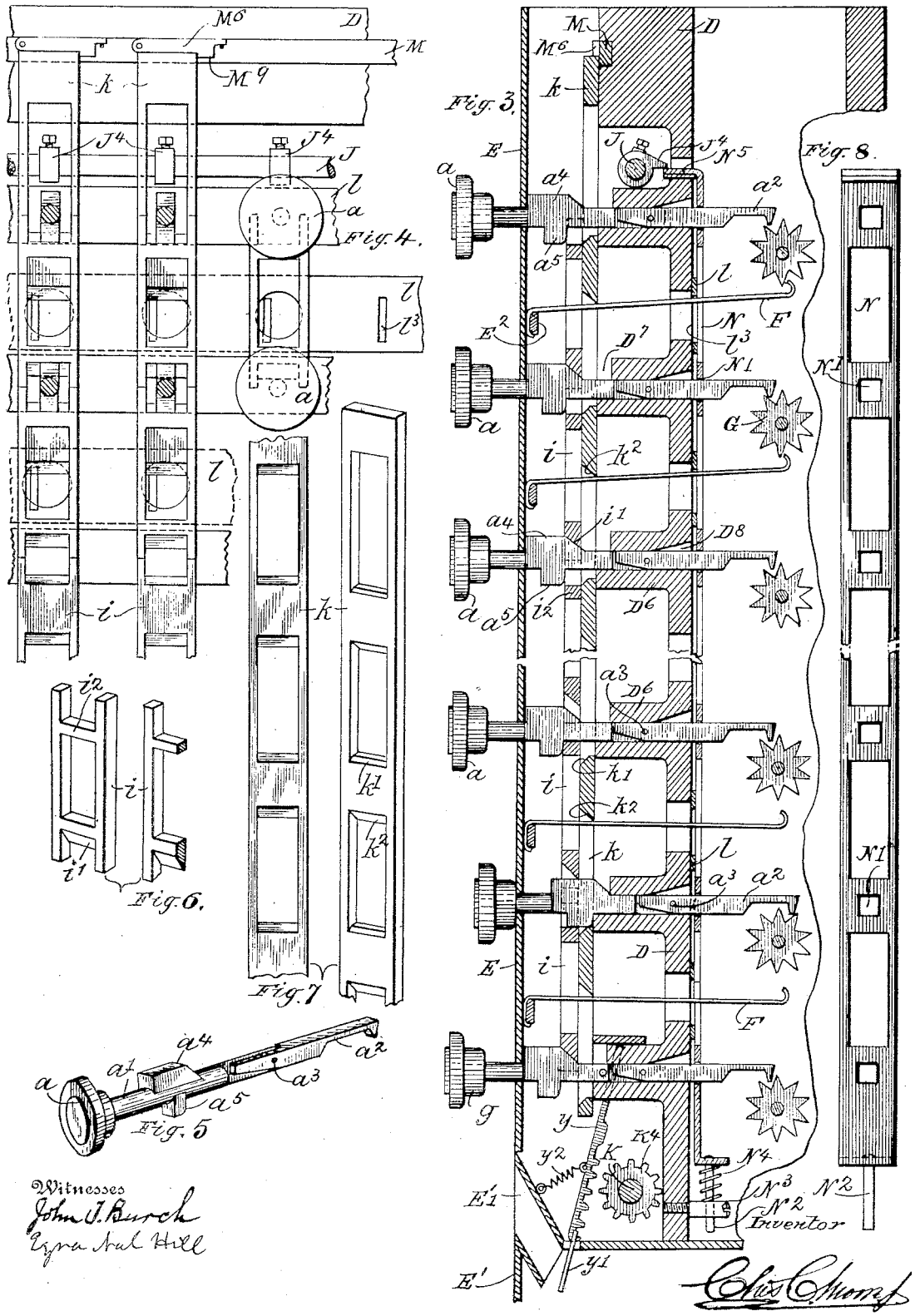

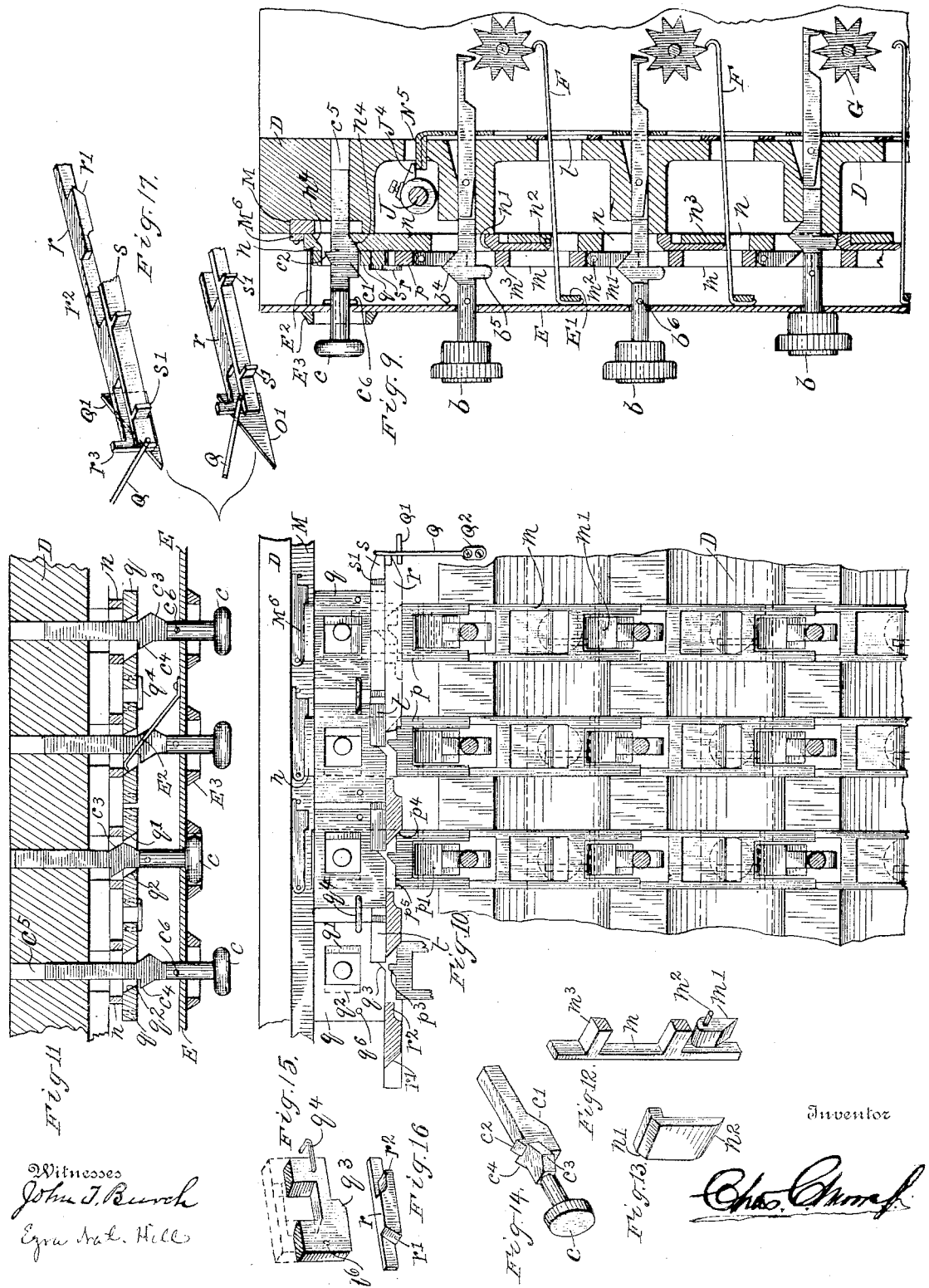

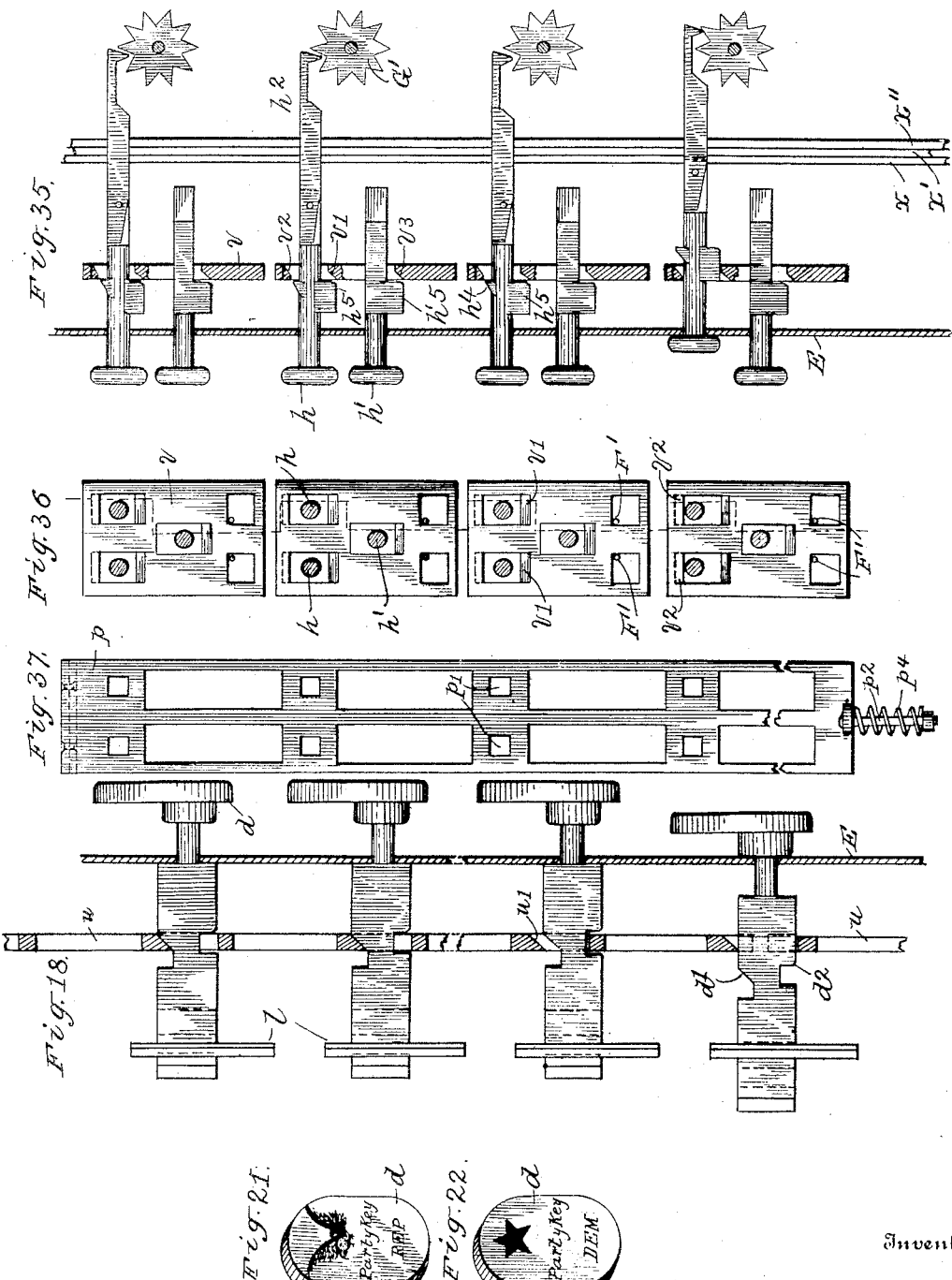

C. C. MOORE, Jr.
VOTING MACHINE.
APPLICATION FILED NOV. 16, 1907.

1,172,548.

Patented Feb. 22, 1916.
15 SHEETS—SHEET 6.

Witnesses
John T. Burch
Eyre Hill

Inventor
Chas C Moore

C. C. MOORE, Jr.
VOTING MACHINE.
APPLICATION FILED NOV. 16, 1907.
1,172,548.
Patented Feb. 22, 1916.
15 SHEETS—SHEET 7.
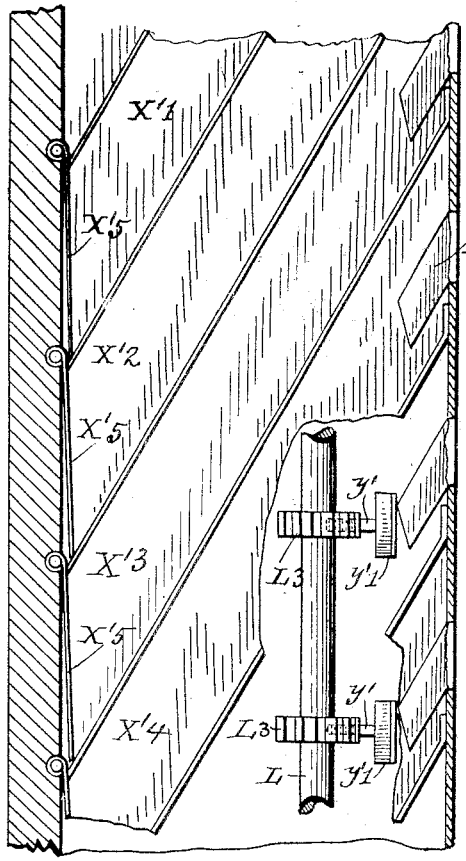
Fig. 25.
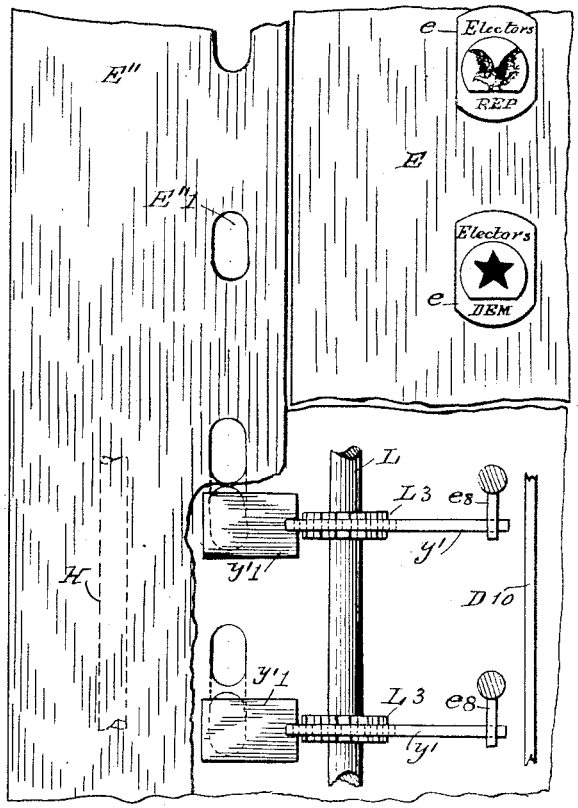
Fig. 23.
Fig. 26.
Fig. 27.
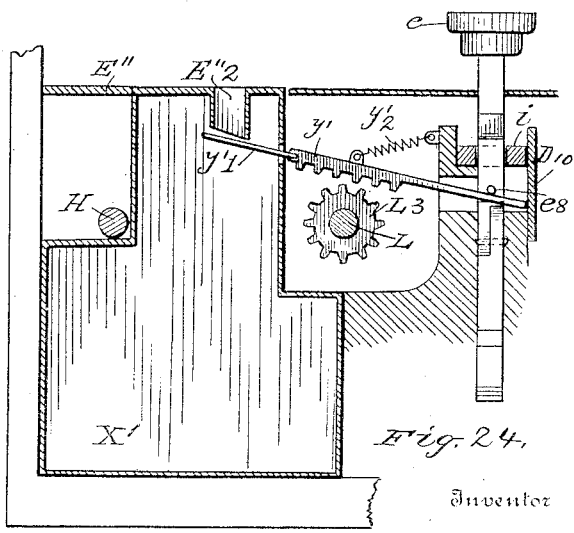
Fig. 24.
Witnesses
John J. Bunch
Ezra Nat Hill
Inventor
Chas C Moore Jr

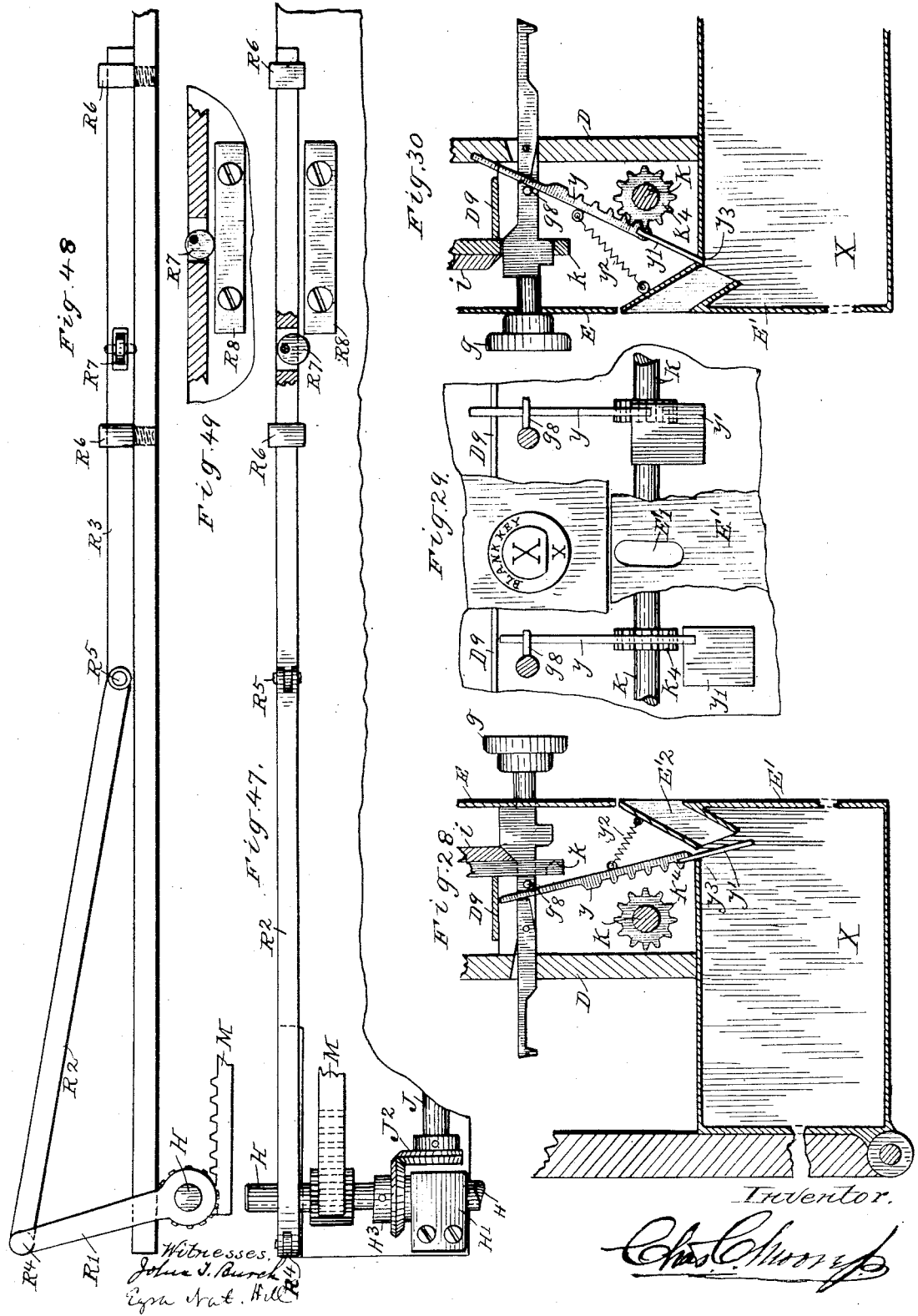

C. C. MOORE, Jr.
VOTING MACHINE.
APPLICATION FILED NOV. 16, 1907.
1,172,548. Patented Feb. 22, 1916.
15 SHEETS—SHEET 9.
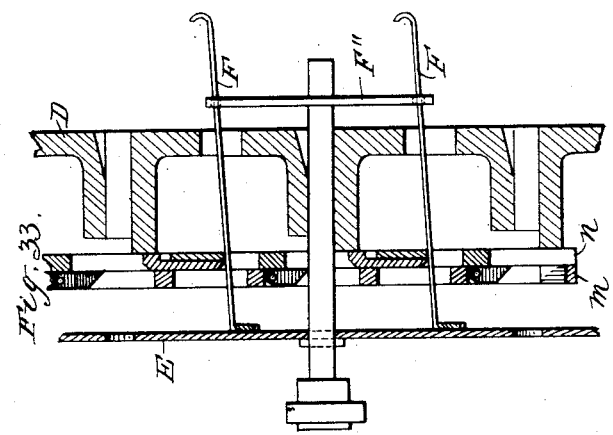
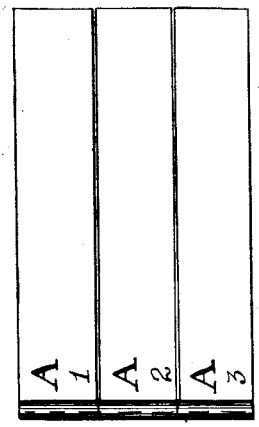
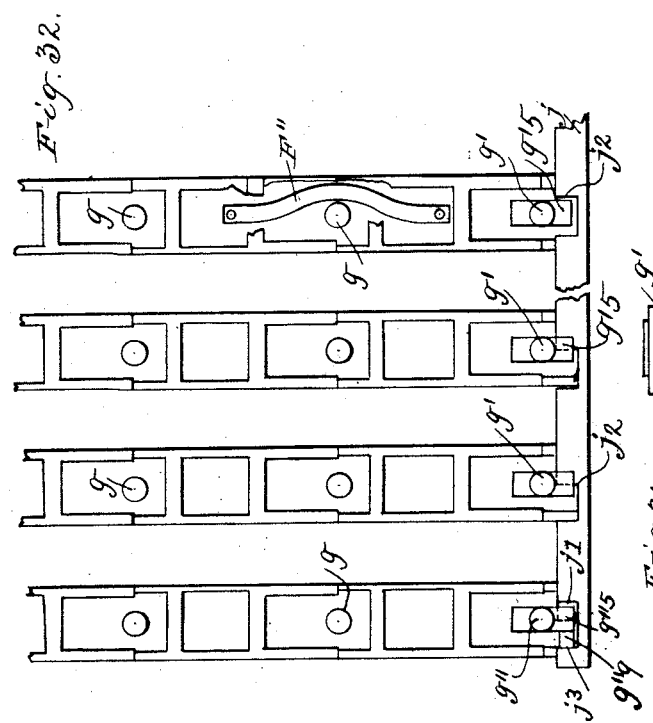
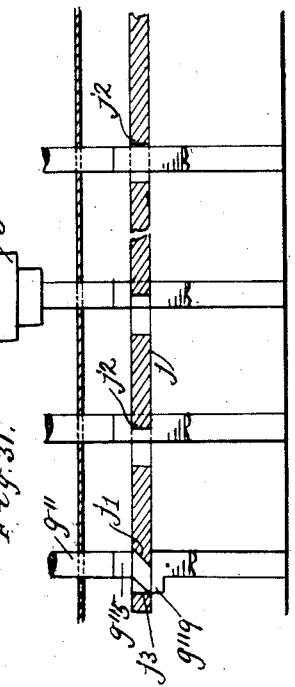

C. C. MOORE, Jr.
VOTING MACHINE.
APPLICATION FILED NOV. 16, 1907.
1,172,548.
Patented Feb. 22, 1916.
15 SHEETS—SHEET 10.
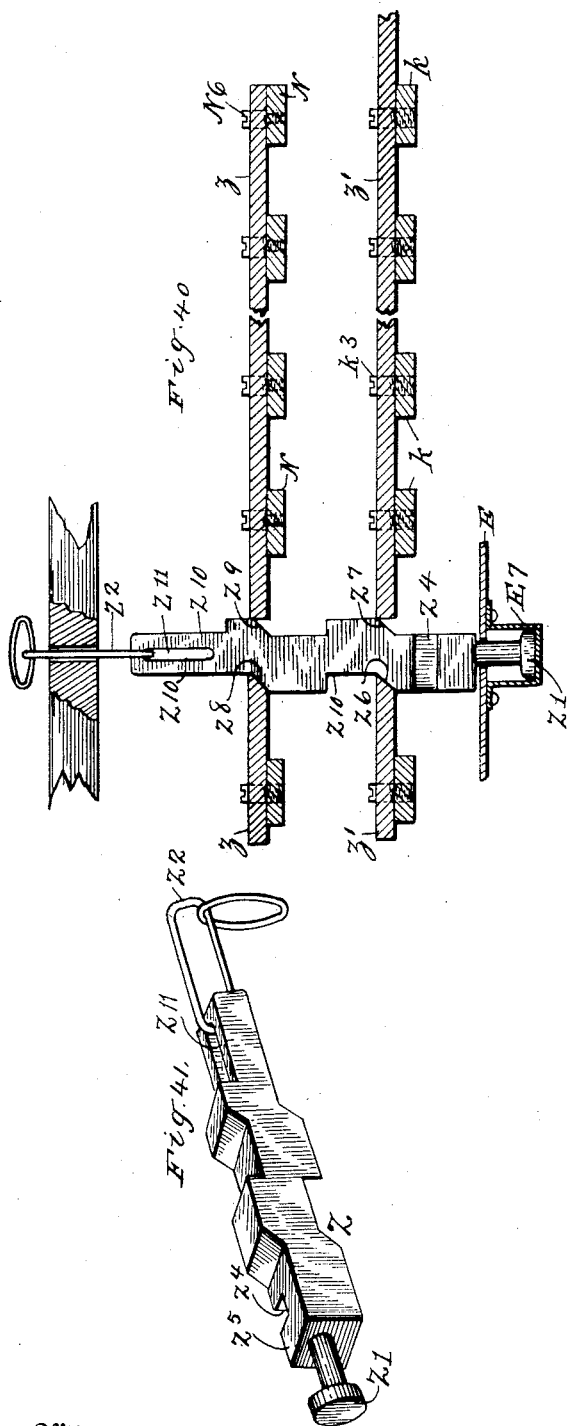
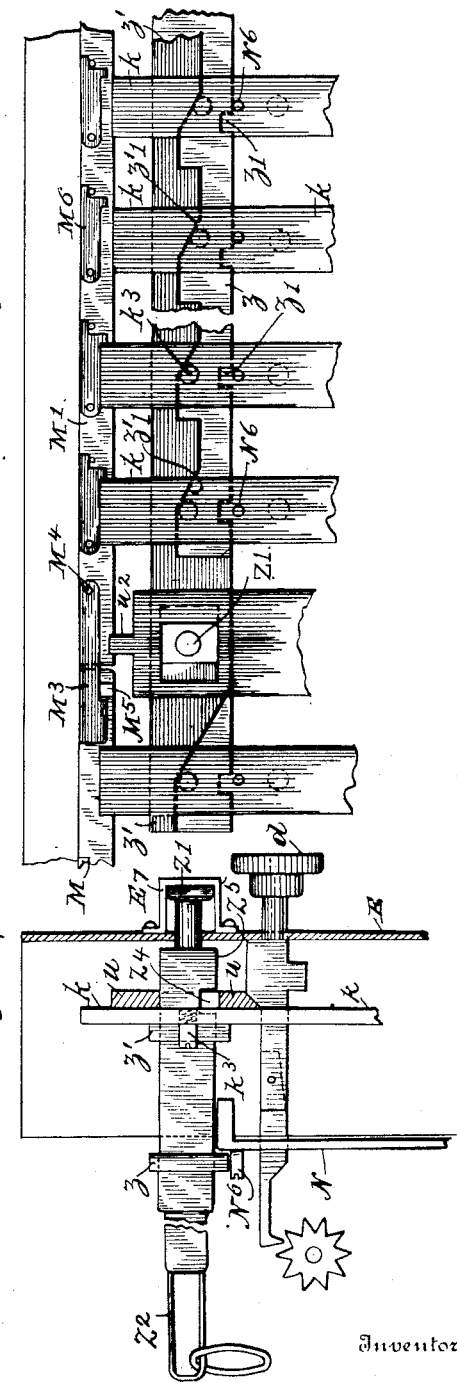

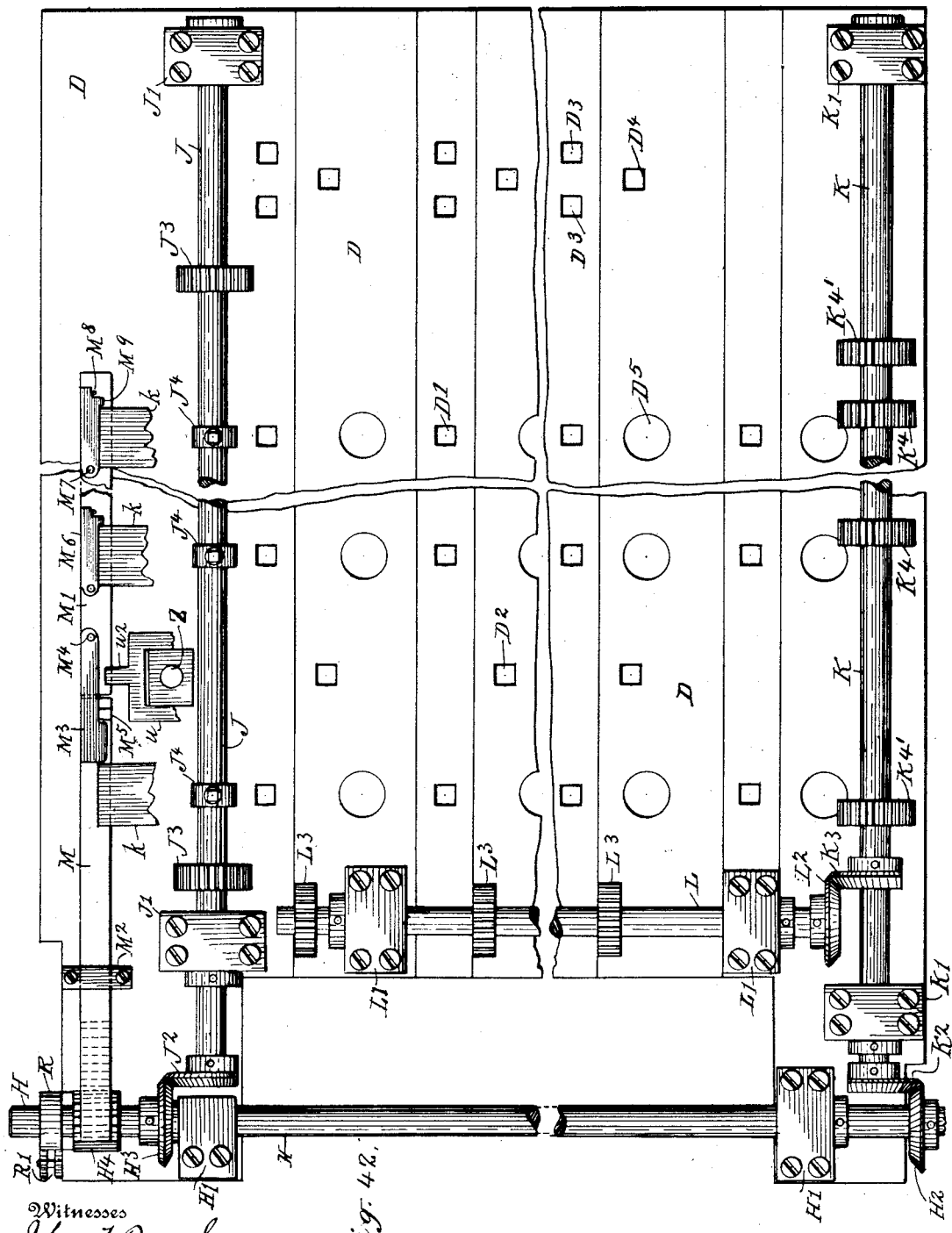

C. C. MOORE, Jr.
VOTING MACHINE.
APPLICATION FILED NOV. 16, 1907.
1,172,548.
Patented Feb. 22, 1916.
15 SHEETS—SHEET 12.
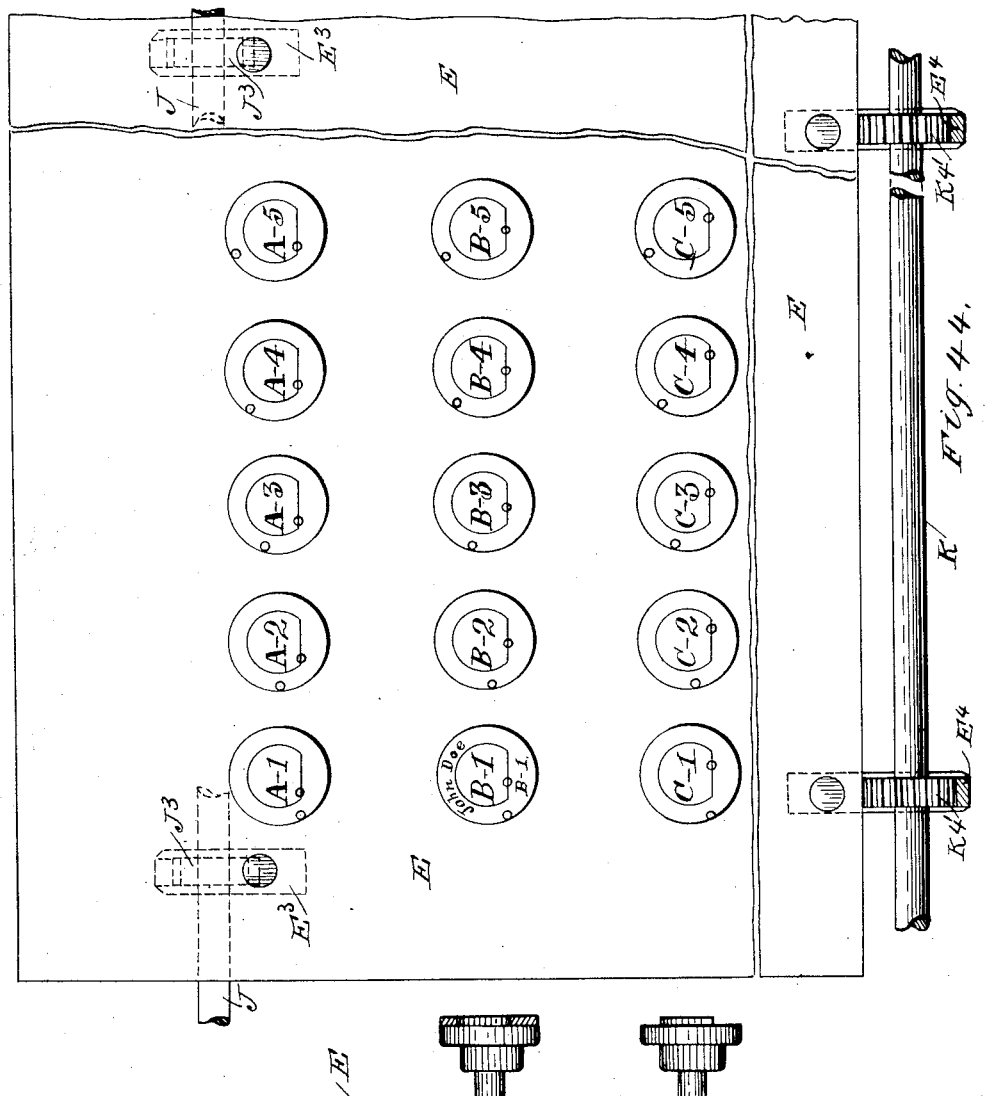
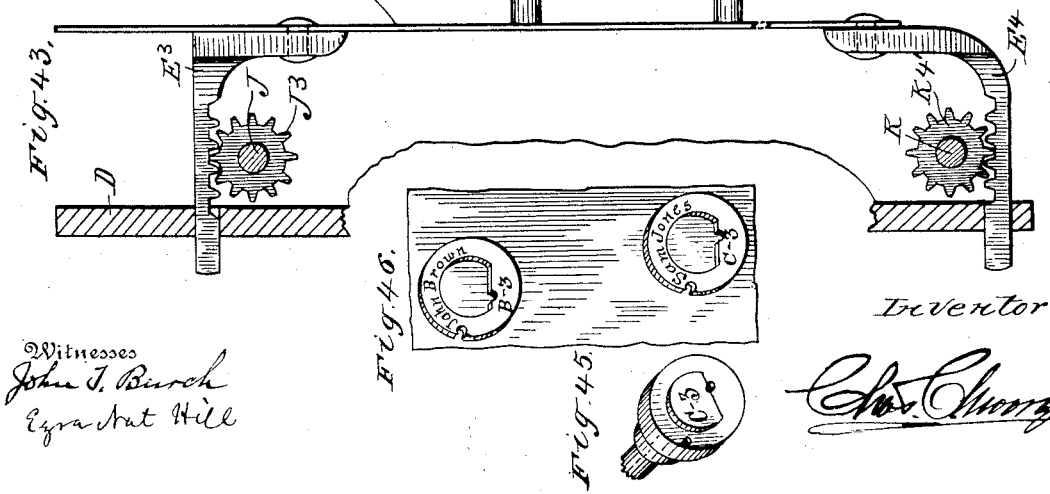

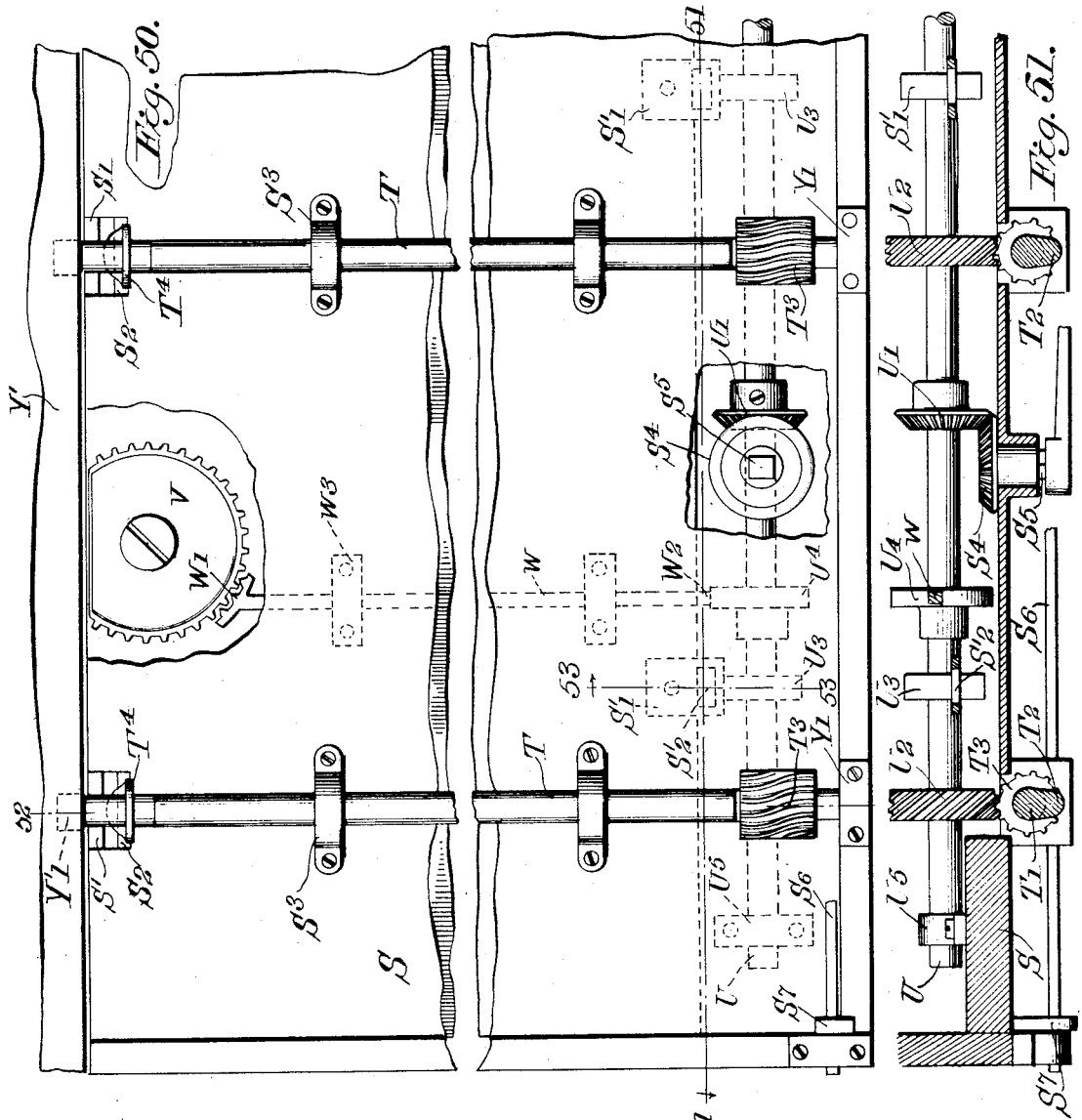
C. C. MOORE, Jr.
VOTING MACHINE.
APPLICATION FILED NOV. 16, 1907.
1,172,548.  Patented Feb. 22, 1916.
15 SHEETS—SHEET 13.

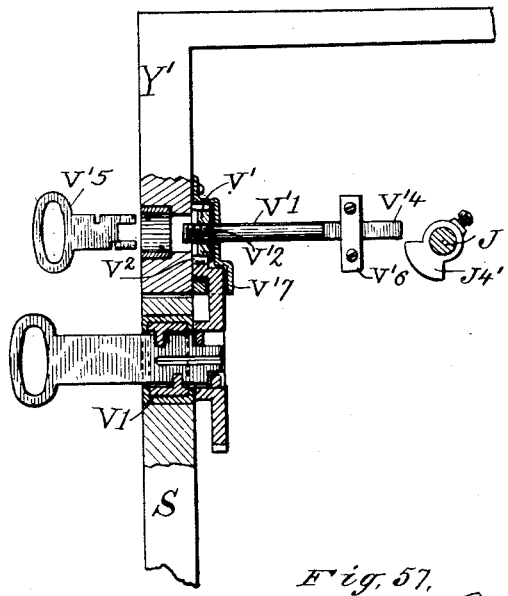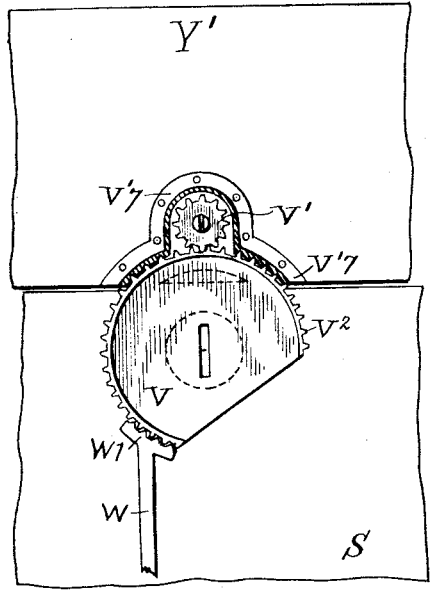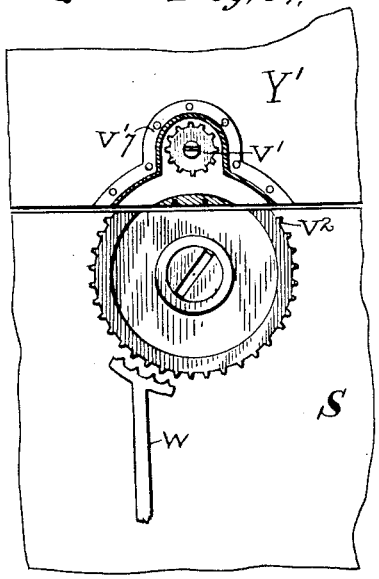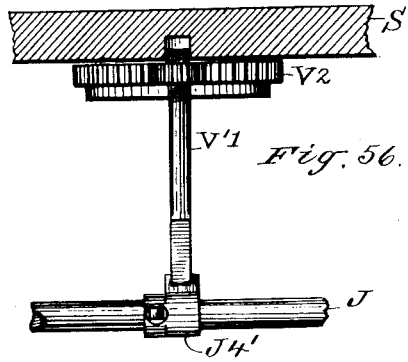

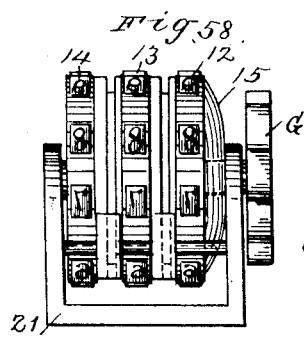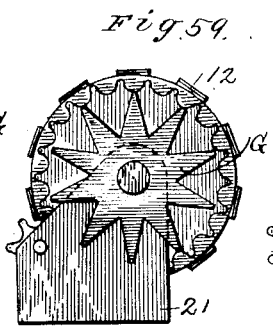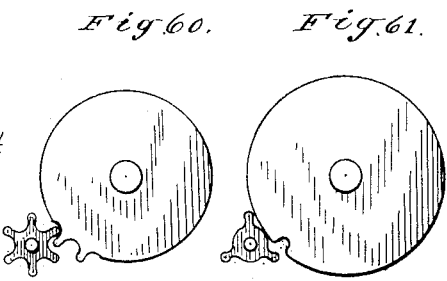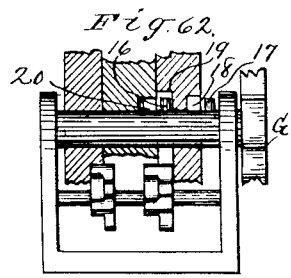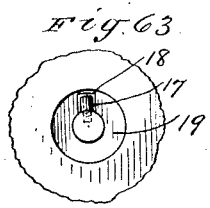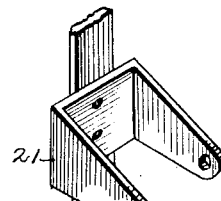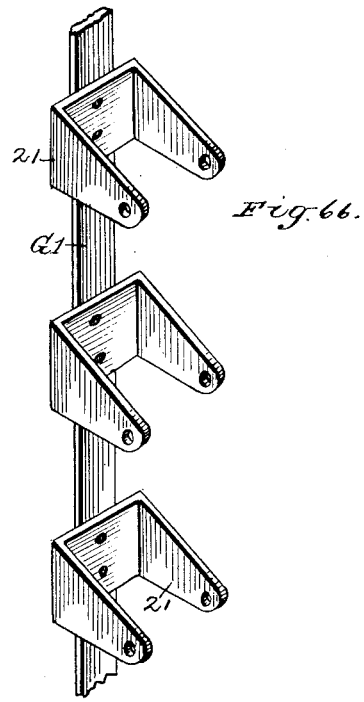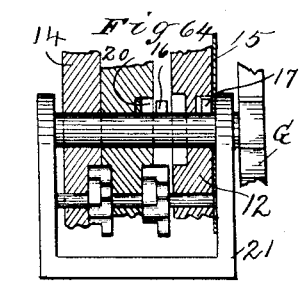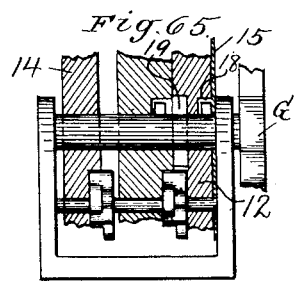

UNITED STATES PATENT OFFICE.

CHARLES C. MOORE, JR., OF LEXINGTON, KENTUCKY.

VOTING-MACHINE.

1,172,548.      Specification of Letters Patent.      Patented Feb. 22, 1916.

Application filed November 16, 1907. Serial No. 402,417.

*To all whom it may concern:*

Be it known that I, CHARLES C. MOORE, Jr., of the town of Lexington, county of Fayette, and State of Kentucky, have invented certain new and useful Improvements in Voting-Machines, of which the following is a specification.

This invention relates to voting machines, some of the features of which were set forth in my application for patent, Serial No. 736,440, filed November 9, 1899.

Generally stated its objects are to simplify and render more certain and accurate in operation those parts of a voting machine which perform the functions which have heretofore been generally performed by voting machines, and in addition to render the machine capable of performing additional and entirely new functions.

The invention contemplates permitting the voter to exercise all of his rights in voting fully and freely while preventing him from exceeding those rights and also contemplates the prevention of any manipulation of the machine by the official having it in charge during its use or in tabulating the results as is necessary in any device which can be considered a successful voting machine.

With these objects in view my invention embodies means for insuring that the names of the candidates shall be correctly associated with the recording mechanism, means for automatically recording the state of the counters when the machine is set up and closed, ready for the first voter, means for preventing incomplete voting, and means for automatically recording the state of the counters as the machine is closed, and again when the machine is opened.

In addition to the above safeguards against error or distortion of the records, the invention embodies means for rendering it easy for the voter to vote for the candidates and upon the questions desired, and to correct any errors made before leaving the machine without however permitting him to exceed his rights in voting. He may cast a straight party vote or a scratched vote or may cast a split vote in the multi-candidate group without being compelled to operate the keys in a fixed order.

Other novel features of my invention will be apparent from the following description, taken in connection with the accompanying drawings.

Figure 19:
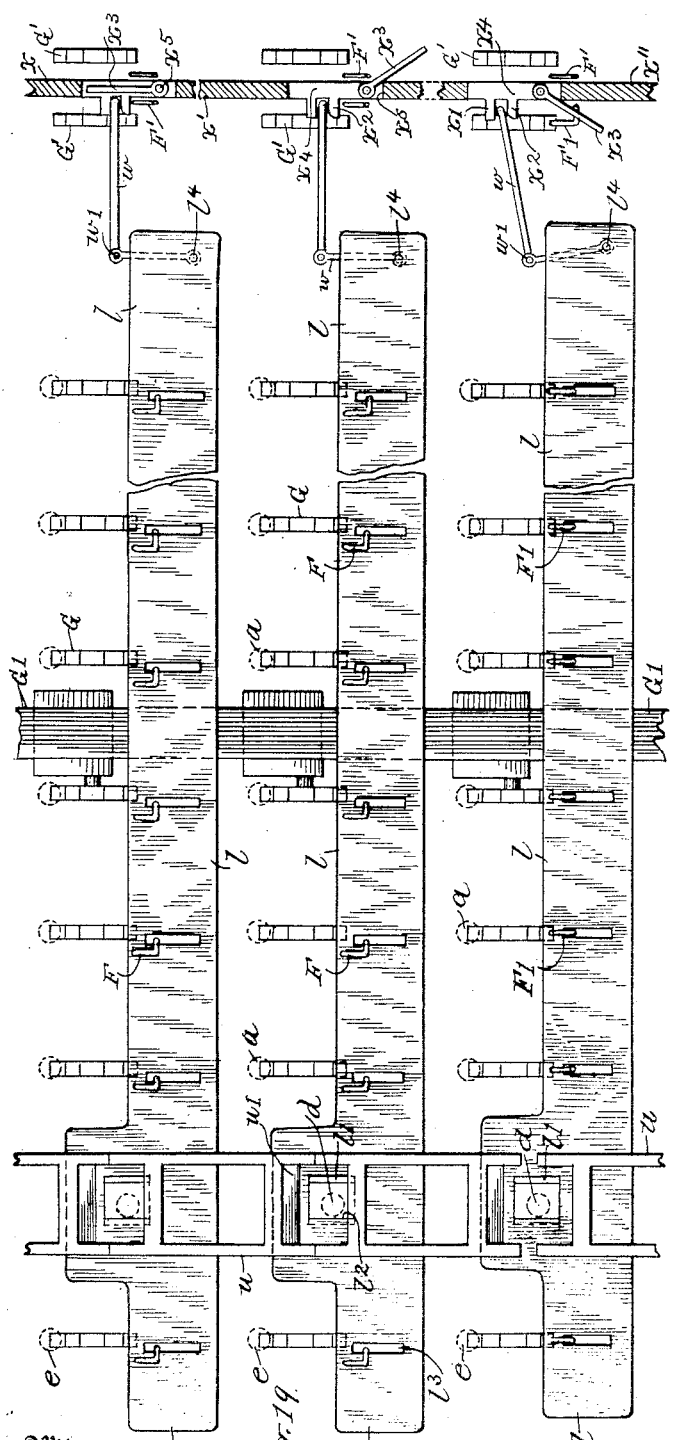
Figure 20:
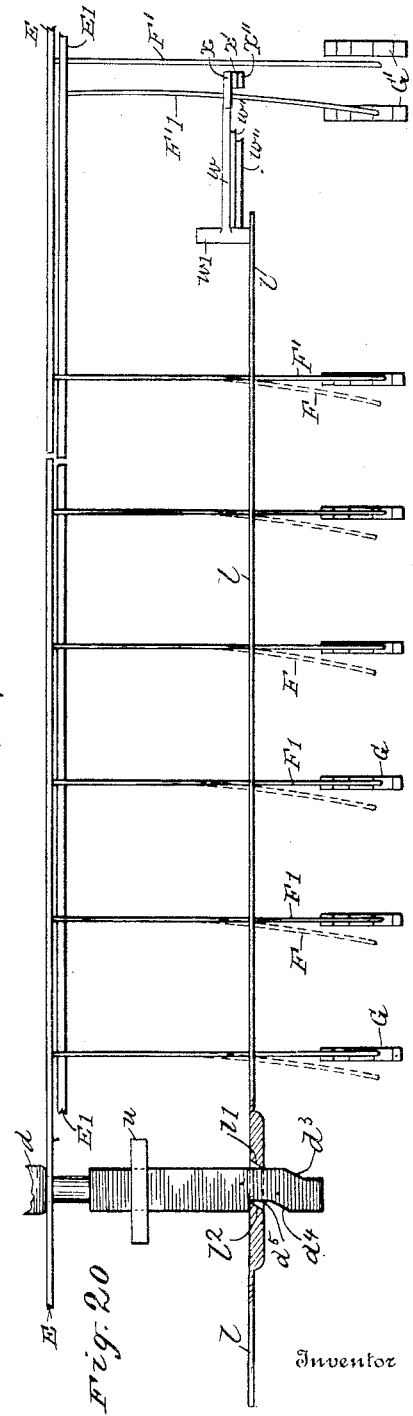

In the drawings, Figure 1 is a perspective view of a voting machine embodying my invention in position ready for use, but with the door closed; Fig. 2 is a perspective view of the machine with the door open, and with a part of the supporting base and a part of the door broken away; Fig. 3 is a vertical section through one of the columns of a single-candidate group; Fig. 4 is a front elevation of a portion of the machine with the front plate removed, showing the mechanism of the single-candidate groups; Figs. 5, 6, 7 and 8 are detail perspective views of the key of a single-candidate group and associated parts; Fig. 9 is a vertical section through one of the columns of a multi-candidate group; Fig. 10 is a partial front elevation of the mechanism shown in Fig. 9, with the front plate removed; Fig. 11 is a horizontal section of the same parts looking down; Figs. 12, 13, 14, 15, 16 and 17 are detail perspective views of a key of a multi-candidate group and coöperating parts; Fig. 18 is a vertical section through a party group; Fig. 19 is a front elevation of the parts operating upon actuation of party keys; Fig. 20 is a plan view of the mechanism shown in Fig. 19; Figs. 21 and 22 are perspective views of the heads of party keys showing the arrangement for the party emblem and name; Fig. 23 is a front elevation partly broken away of a portion of the machine used for presidential electors showing the means for splitting the vote: Fig. 24 is a horizontal section of this part of the machine looking down; Fig. 25 is a vertical section partly broken away, taken at right angles to the face of the machine; Fig. 26 is a perspective view of slips of paper used in the substitution of candidates; Fig. 27 is a perspective view of the slip of paper rolled up and sealed by the gummed strip, ready for insertion into the aperture provided for that purpose; Fig. 28 is a vertical section through a blank key, or the termination of a candidate column; Fig. 29 is a front elevation of the same part; Fig. 30 is a sectional view of the same part, showing a "blank" key in operated position; Fig. 31 is a horizontal section through the "blank" keys, that are comprised in a multi-candidate group; Fig. 32 is a portion of a front elevation including the same part of the machine; Fig. 33 is a vertical section through a multi-candidate group column, illustrating the provision for multi-indorsed candidates in a multi-candidate group; Fig. 34 is a coupon form of paper ballot, used for the substitution of other names for the candidates comprised in a multi-candidate group; Fig. 35 is a vertical section through a questions-key column; Figs. 36 and 37 are detail views of parts operated by the question keys; Fig. 38 is a front elevation showing the arrangements for adjusting the machine for use of a "limited" voter; Fig. 39 is a vertical section through the "limiting" key; Fig. 40 is a top view of the same portions of the machine; Fig. 41 shows the "limiting" key in perspective; Fig. 42 is a front elevation of the base plate of the machine and the shafts moving in boxing attached to the base plate; Fig. 43 is a vertical section showing the movable face plate of the machine connected to record the vote and means for moving it; Fig. 44 is a front elevation showing the face plate and keys with means for avoiding displacing candidates' names on the keys; Fig. 45 shows a keyhead in perspective; Fig. 46 shows the candidate labels designed to be placed on the keys; Fig. 47 is a front elevation of the full stroke device provided to avoid an incomplete actuation of the machine gate; Fig. 48 is a top view of the same; Fig. 49 is a horizontal sectional view showing an operative position; Fig. 50 is a front elevation of the mechanism on the rear door, provided for the printing of the counter records at the time of closing and opening the rear door, the door being partly broken away to show some mechanism behind it; Fig. 51 is a horizontal section, on the line 51—51 of Fig. 50; Fig. 52 is a vertical section on the line 52 of Fig. 50; Fig. 53 is a detail in cross section on the line 53—53 of Fig. 50; Fig. 54 is a front elevation of the lock on the rear door for preventing access to the counting mechanisms; Fig. 55 is a vertical section through the same; Fig. 56 is a plan view of the same part in section; Fig. 57 is a front elevation of the lock in operated position; Fig. 58 is an enlarged front view of the counting mechanism; Fig. 59 is a side view of the counting mechanism; Figs. 60 and 61 are detail views of parts of the counting mechanism; Fig. 62 is a fragmentary sectional view showing the counters in one operated position during resetting; Fig. 63 is a side view of the parts shown in Fig. 62; Figs. 64 and 65 are sectional views showing the counters in other operated positions during resetting; and Fig. 66 is a perspective view of the means for supporting a series of counters in a vertical column.

In these drawings similar letters represent corresponding parts in all views, and for convenience in distinguishing the groups of mechanism I have used small letters to indicate those parts which operate as the voting keys are manipulated, and have used large letters to indicate those parts which are operated only as the voter leaves the machine by the swinging of a gate which he must turn in order to leave. In addition to this a single reference letter is used upon each group of parts which operate together, the parts of the group being distinguished by different numerals used with the letters.

As shown in Fig. 1, A represents a support for the part B, which contains all of the voting and recording mechanism. The support A is preferably made in the form of a casing in which the voting machine B may be packed when not in use. When mounted ready for use the stand may be supported by a removable brace, as shown, and will be placed, facing a wall, so as to leave room for the voter to pass between it and the wall. The gate C (see Fig. 2) extends outwardly from the face of the machine and the machine is placed so near the wall that the voter will necessarily swing the gate in passing out from behind the machine. This gate is so connected as to operate the counting and registering mechanism in accordance with the keys which have been pressed by the voter, as will be described hereafter, and it is controlled by a full stroke device so that it must be completely operated in either direction before it can be reversed. The front door of the voting machine B is hinged at the top and opens upward, and thus serves as a screen for the voter when in front of the keyboard.

In Fig. 2 I have shown on the face of the machine numerous push buttons for registering the will of the voter, and it will be understood that each is connected with suitable mechanism within the machine for either registering its operation or setting the registering mechanism for operation by the swinging gate. These push buttons are termed "keys" or "voting keys", but it will be understood that the invention is not limited to their use, and that the "keys" may be levers, pull buttons or any other mechanism which the voter actuates in voting. The keys are arranged in vertical and horizontal rows. The vertical row marked $d$ at the left of the machine in Fig. 2 are the party keys and by pressing any one of them a straight party vote may be cast for the candidates of the party indicated thereon. To the left of these there is a vertical row of keys $e$ which are the keys for the presidential electors, and it will be understood that these keys will be omitted or used for some other purpose at elections where no presidential electors are to be voted for. Each key in this row represents a group of presidential electors nominated by the party represented by that key.

To the right of the vertical row of party keys $d$ which preferably have visible on their ends the party emblems and names to which they respectively relate I place a series of vertical rows of keys $a$ which I call "candidate keys", since each key is for a single candidate. All of the keys in a vertical row represent candidates of various parties for a single office, such as governor or lieutenant governor, and the name of the office appears at the top of the row. Each horizontal row of these keys $a$ represents the several candidates of a single party for the various offices, the particular party being indicated on the party key $d$ in that horizontal row. It will be observed that there is an additional key $g$ added at the bottom of each vertical row of keys $a$, thus making a horizontal row of keys $g$ which are not in line with any party key $d$. An additional party key might be added to the party column in line with the keys $g$, but if so it would have the name of no party on it and would be a "blank party key". The keys $g$ relate to no particular party, and I term them "blank" candidate keys. They operate mechanism however similar to that of the regular candidate keys, and are therefore to be distinguished from the so-called "irregular" candidate keys heretofore used for operating special mechanism to permit voting for a candidate not named by any party. While these keys $g$ operate counting and interlocking mechanism in the same way as do the candidate keys they perform the additional function of opening an aperture $E'^1$ (see Fig. 3) in which may be placed a slip of paper rolled up as shown in Fig. 27, containing the name of any person desired as a substitute for the candidates named or any suggestion with reference to the office in question.

The group of keys $a$ are called the "single candidate" group because only one candidate is to be voted for for one office, but usually there are some offices to which several candidates are to be elected and consequently provision must be made for voting for more than one. For this purpose I have shown a series of keys $b$ which may be termed "multi-candidate" keys. There will be placed on the machine as many vertical rows of multi-candidate keys $b$ as there are places to be filled. The actuation of a party key $d$ will set the mechanism to cast votes in the "multi-candidate" group for the nominees of that party, but the voter may wish to split his vote or "scratch" a particular candidate of that party and therefore I provide a series of keys $c$ in a horizontal line at the top, one being in each vertical row of keys $b$. The mechanism is such that the actuation of a key $c$ renders inoperative the counting mechanism of that vertical row from the party keys so that the party key cannot cause a vote for any one named in that column. When a party key is actuated therefore the actuation of a key $c$ will "scratch" the candidate of the party in that vertical column. This actuation of key $c$ is furthermore necessary before any individual key in the column can be actuated. When key $c$ has been pressed in, any key in the "multi-candidate" group $b$ may be operated. The key $c$ cannot be withdrawn after it has been actuated, and therefore the number of keys $c$ is the limit to the number of keys $b$ which may be actuated in the multi-candidate group. In connection with the multi-candidate group I have provided a horizontal row of "blank" keys $g'$ at the bottom which are similar to the keys $g$ opening receptacles below them to receive a paper slip such as shown in Fig. 27. These keys are similar to the other keys and operate counting and interlocking mechanism, and their purpose is to permit scratching all candidates in that column and voting for some one not named.

To the right of the multi-candidate keys there is a vertical column of questions upon which votes are to be taken, and to the right of that is a vertical column of keys for indicating the vote upon those questions. These keys are arranged in groups of threes, the two upper keys $h$ of each group being to indicate a vote in the affirmative or negative upon the question set opposite, and the lower key $h'$ being for the purpose of correcting any action of the party key in indicating a vote upon the question. The operation of a party key will operate the question key in the affirmative or negative, according to whether the party platform endorses it or not, but the lower key $h'$ permits an independent vote on this question when voting the party ticket.

In order to permit the substitution of other candidates than those named for presidential electors the machine is provided with apertures $E''^1$ which are opened by the corresponding keys and permit the insertion of slips of paper containing the names desired as in the case of the blank candidate keys.

The use of the "blank" keys in the various groups operating counting and interlocking mechanism makes it possible to provide against incomplete voting and insures against inaccuracy in the working of the counting mechanisms. The setting and interlocking mechanisms are such that the final operation in the casting of a ballot cannot be accomplished until each office for which there are candidates to be elected will have had one key in that group, or the blank key in that group, properly actuated. This prevents incomplete voting by oversight.

The mechanism of the blank keys being like that of the others, the chances of inaccurate working are reduced and the sum total shown by the counters in each office group will be the same, corresponding to the number of voters.

The face plate E of the machine through which the stems of the voting keys pass is made movable a short distance out toward the position occupied by the voter, although it is normally in the same plane as the fixed margin plates E' and E''. See Figs. 2, 24 and 28. The plate E is given this outward movement by the swinging of the gate C as the voter leaves the machine, and it is again returned to normal position as the gate C is swung back into the position shown in Fig. 2, the mechanism for accomplishing this being described hereafter. In its outward movement the plate E engages the enlarged heads of such of the voting keys as have been pressed in (see for instance Fig. 3), and withdraws them to normal position, the operation of the gate having first released all keys so that they can be withdrawn.

The actuation of the counters corresponding to some keys takes place as the keys are pressed in, and may be revoked by pulling the key out again prior to the swinging of the gate C in the final act of voting, whereas other keys simply set the mechanism so that the counters will be actuated only as the gate swings. The party keys are of the last mentioned or delayed action type, whereas the single candidate keys are of the first or direct action type.

The purpose and functions of the various parts of the machine will be more fully understood as the specific groups of mechanism are considered and their relations set forth.

Back of the movable face plate E and extending also back of the thin fixed plates E' and E'' there is a heavy cast metal plate D which I term the base plate, since it supports or carries most of the operative parts. It is shown in cross section in Fig. 3 and it extends from top to bottom and from end to end of the machine in a vertical plane when the machine is in operative position. It is formed with transverse ribs $D^6$ through which openings are made to constitute elongated supporting bearings for the spindles of the various keys, there being a rib for each row of keys. The openings to receive the key spindles are preferably made rectangular in section so as to prevent turning of the keys, and between the ribs the plate is made thinner for the purpose of lightness. Between the ribs furthermore openings are made for the free passage of the spring hooks F which are secured to the movable plate E and operate the star wheels G in the rear of plate D.

There is a star wheel for each of the voting keys on the machine, except the party keys, and turning it operates the counters corresponding to that key. They are so placed that a hook or projection on the end of the key spindle will turn them as the key is pushed, and also as it is pulled out, unless the action is interfered with. There is also a spring hook F for each star wheel secured rigidly to the movable face plate E at one end by the bar $E^2$ and having a hook at its other end adapted to engage the star wheel and turn it as the plate E is moved forward. Being in the form of springs these hooks may be bent out of operative engagement with any particular key by the mechanism hereafter described. The stems or spindles of the voting keys in the different groups differ from each other in some respects to adapt them to their particular use, but they are all made in two sections as shown in Figs. 3 and 5, the rear section $a^2$ being hinged to the front section by a pin $a^3$ which permits the rear section to be raised out of contact with the star wheel G. The bearing openings in the ribs $D^6$ are cut away at their inner upper portions as shown at $D^8$ to permit this raising action. Means for raising the ends $a^2$ at the proper times will be described later, and it will be understood that such means is necessary, otherwise the total effect of the key on the counter would be nothing, since it would simply be pushed forward and then pulled back to original position. From the above construction it will be noted that the voting keys above mentioned operate the counters by direct action, whereas the hooks F turn them by delayed action at the time that plate E is moved by the turning of gate C.

In order to lift the ends $a^2$ so as to prevent reversing the count of those keys which have been operated there is a vertical plate for each row of keys placed behind the plate D, and this plate has openings fitting the ends $a^2$. A spring tends normally to raise it and it is held down by a finger such as $J^4$ (see Fig. 3) on shaft J which extends along the upper part of plate D and which is oscillated by the gate C to raise finger $J^4$ before the keys are withdrawn by plate E.

In order to fully understand the structure and operation of the keys $a$ in the single candidate group and the interlocking mechanism therefor, reference should be had to Figs. 3, 4 and 5 of the drawing. Other groups of keys have many similar parts having analogous functions and an understanding of this group will assist in understanding the others without a repetition of the detailed description.

For each candidate group there is a slide bar $k$ fitted into the front face of the base plate, and capable of vertical movement;

also a train of locking blocks $i$, resting on the bar $k$, being held in position by suitable clips, which blocks $i$, have a vertical movement. These blocks $i$ constitute the interlocking mechanism in a single candidate group. When any key $a$ is actuated, its projection $a^4$ impinges on the surface $i^1$, forcing the block $i$ upward, whereupon the part $i^2$, is forced under the projection $a^5$, such that another key cannot be actuated. The train of blocks $i$ above the actuated key, in like manner, locks the keys from operation, and since the train below the actuated key cannot move owing to the projection $a^5$, all keys below the actuated key are locked. It is seen that the actuated key separates the train, causing only those blocks above it to move.

The interlock mechanism operates during the first eighth inch travel of the actuation of the key. During the second eighth inch travel of the key, the bar $k$ moves downward owing to the impinging of the projection $a^5$ on the incline $k^1$. In the downward movement of the bar $k$, the surfaces $k^2$, impinge on the spring hooks F, forcing all such hooks in the same vertical column down, as shown in the lower part of Fig. 3, this part being in operated position. When the bar $k$ is thus forced down, its upper end clears the projection $M^9$ of the dog $M^6$, permitting the lateral movement of the bar M, so far as that candidate group is concerned. The bar $k$ performs no other function than the two described.

It will be noticed that during the actuation of a key, no movement of the star wheel G is performed during the first eighth inch of travel, but only during the last of the travel is the star wheel moved by the farther extremity $a^2$ of the key. These star wheels are part of the counting mechanism. It is noticed the withdrawal of the key would reverse the star wheel movement, and so revoke the previous count. Therefore such a vote could be withdrawn, were the voter desirous of changing his selection. To avoid this reversing of the star-wheel, when the keys are withdrawn by the face plate, in the final operation of the voter, a bar N, placed on the back of the bed-plate, carries in its openings $N^1$, the farther extremities $a^2$, of the keys in a candidate group. When the shaft J has been operated by the opening of the gate C, the lug $J^4$ lifts, releasing the termination $N^5$ of the bar N, such that the coil spring $N^4$ lifts the bar the lower end of which plays through the guide eye $N^3$. As this bar lifts it carries with it the parts $a^2$, which swing on the pivots $a^3$, thus permitting the star-wheels to be cleared upon the outward movement of the face-plate, while upon the closing of the gate, the dog $J^4$ forces the bar N into normal position. There is such a bar for each candidate group, and it performs no other function than the one described. Clearance in the base plate is shown at $D^8$ to permit the lifting of the key parts $a^2$. Clearance $D^7$ is to admit the key projection $a^4$. The square holes $D^1$, in the base plate through which the keys move, prevent their turning.

The operations attendant upon the actuation of keys in a multi-candidate group are shown in Figs. 9, 10, 11. The construction of these keys and the moving parts operated by them varies from those in the single candidate group, though with the exception of the preliminary actuation of a key $c$, these keys are not different from the others in appearance, or method of operating, so far as the voter is concerned. As previously explained, these keys are normally locked, and the group is rendered operative by the actuation of a key $c$. No second key $c$ can be operated until a key in the group has been actuated, nor can a second key in the group be actuated until a second key $c$ has been actuated. It is thus seen a multi-candidate group is established by combining a definite number of keys $c$ into a group.

In a multi-candidate column the bar $n$ is a modification of the bar $k$, in a single candidate group described, $n$ varies in having a movable piece $n^1$—$n^2$, (see Fig. 13). This piece plays over $n^3$, a part of the bar. When the projection $b^5$ impinges on the incline surface $n^1$, it forces the movable piece only, downward, in which the end $n^2$ impinges on the adjacent hook F, moving it downward. Owing to this construction, the actuation of a multi-candidate key does not carry down the series of hooks F, in that vertical column, but the single hook corresponding to that key. When a key $c$ is actuated, its projection $c^1$ impinges on the inclined surface $n^4$, causing the bar $n$, to move downward, in which all the parts $n^3$, impinge on all the hooks F, in that vertical column, carrying them downward. The bar $n$, when operated will have cleared its corresponding dog $M^6$. When the bar $n$ has moved downward, a spring finger $E^2$ slips in between the head of the bar and the left end of the dog $M^6$, such that this bar $n$, can not be forced up, which in turn locks key $c$ from being withdrawn. As shown in Fig. 11 the spring finger $E^2$ bears against the face of the bar $n$ at its end immediately below the dog $M^6$ and consequently when the bar $n$ moves downward the end of the finger $E^2$ by its spring action passes in over the end of the bar $n$ and between it and the dog $M^6$, thus interposing an obstruction preventing the bar $n$ from being moved back up against the dog $M^6$. The spring finger $E^2$ (Fig. 9) is fastened to the face plate and upon the outward movement of this plate the finger $E^2$ moves with it, thus clearing for the movement of bar $n$. The train of blocks $m$, is substituted for the train $i$ described. The blocks $m$ vary from $i$ in having a tongue $m^1$, swinging on a pivot $m^2$, this being necessary in order that the keys may be withdrawn when the face plate moves, as these blocks return to their normal position after a key has been pushed in. This return to position is owing to the form of projection $b^4$ on the multi-candidate keys. Also, owing to the form of the projection $b^5$, the part $m^3$ clears an operated key, thus permitting of any other key in the column to be subsequently, though not simultaneously, actuated, so far as the train $m$ is concerned. This train $m$ terminates in its upper end in a special form of block $p$, having a tongue $p^1$, similar to, and for the same purpose as the tongue $m^1$. The blocks $p$ terminate in the projection $p^3$, which projection must have clearance, before any key in the column can be pushed in.

$q$ is a horizontal train of blocks capable of movement to right and left. These blocks are coupled by the staples $q^4$, inserted in the holes $q^6$. (See Fig. 15.) The series of blocks so coupled into a train constitutes the limiting mechanism in a multi-candidate group, as through such connections two or more columns are brought into mutual relation.

$t$ is a small regular shaped block lying adjacent to $q$, as though it may have been cut out of the block $q$. When a key $c$ is actuated its projection $c^3$, impinges on the incline $q^1$, forcing the block $q$ and all in its train to the right. This train carries all blocks $t$ in it, from over the projections $p^3$, thus providing the necessary clearance for this projection in order to operate a key $b$. When any key $b$ is operated the corresponding block $p$ is raised so that the inclined face of the projection $p^3$ engages the inclined face $q^3$, thus moving the blocks $q$ and $t$ back to such position that the blocks $t$ will be above the points of all other projections $p^3$ in the series preventing the operation of any other key $b$.

In Fig. 10 the two blocks $q$ to the left are in a train, forming a multi-candidate group of two; a key $c$ in the group having been actuated, thus admitting of the actuation of any key $b$ in the group. The two blocks $q$ on the right, in the same figure, constitute a second multi-candidate-group. No key $c$ in this group has been actuated, therefore no clearance is shown for the projections $p^3$, and in consequence, no key $b$ in that group can be actuated. In the first mentioned group a second key $c$ can not be actuated owing to interference by its projection $c^4$. $r$ is another horizontal train of blocks movable to right and left, and which serves as an interlock between the blocks $p$, to prevent the simultaneous operation of two of them thus preventing the simultaneous operation of two or more keys $b$. When the block $p$ moves upward, its shoulder $p^4$ impinges on the incline $r^1$, forcing it to the right, and taking with it all of the train to the right; when the projection $r^2$ extends over the left shoulder $p^5$, preventing the forcing up of any block $p$, to the right, while those to the left, can not be forced up, owing to the projection $r^2$ abutting $p^5$. The right extremity of this train of blocks $r$, impinges on the spring Q. The train $r$, performs no other function than described. This train is shown in Fig. 17 with the train reversed for purpose of better illustration.

S is a bar resting horizontally along the tops of the train $r$, and serving to hold in position the train $q$. In Fig. 10 it only extends over the first right end block, being discontinued, for the sake of illustration. It is to be understood as extending along the entire system of the limiting mechanism. This bar is best seen in Fig. 17, where it is in reversed position for better illustration. The projections $S^1$ on it, serve to reset the small blocks $t$, and which blocks when carried to the right by $q$, move with them the bar S, until the projection $S^1$, will have come in contact with the left side of blocks $q$. The bar S is thus carried to the right in the actuation of any key $c$, and remains in that position until returned by the spring Q. Likewise do the small blocks $t$ when displaced by projections $P^3$ until returned to normal position by the bar S. The train $q$ when carried to the right by the actuation of a key $c$, will remain, until the projection $p^3$ will have impinged on the incline $q^3$ and carried the train to normal position, the block $p$ being returned by gravity together with the pressure of $r^1$ on the shoulder $p^4$. The train $r$ when having been carried to the right by the pressure of blocks $p$, is returned by means of the spring Q, immediately upon release of the upward pressure of $p$, which pressure is released as soon as the projection $b^4$ of a key has passed the tongues $m^1$ or $p^1$.

Q is a spring fastened to the bed plate at the end $Q^2$, and resting with tension on the incline bridge $Q^1$, which incline is also rigidly fastened to the bed plate. As the spring Q is forced to the right by the train $r$, owing to tension it slides down the incline bridge. When Q is in normal position, the bridge holds it up, so the bar S may pass under it, coincident with the actuation of a key $c$; and with the bar resting in this operated position, as soon as the spring Q is carried a trifle to the right by the train $r$, the spring Q travels along the top of bar S, until clearing it, when the spring snaps down to the bridge, being now resting behind the end of bar S, such that when released it carries the bar S back to normal position, at which time the spring will have traveled up the incline far enough to escape the bar S, and leave it free for a succeeding operation. The spring Q continues to impinge on the projection $r^3$, thus carrying the train $r$ to normal position, while continuing to impinge upon it at all times. It is to be understood the bar S, the train $r$ and the spring Q, serve for one or more multi-candidate groups.

When a key $c$ has been actuated, its head sinks into a form of collar $E^3$ on the face plate, such that it can not be withdrawn by the voter. This collar is shown in Figs. 9 and 11, around the key $c$. When the keys $c$ are being withdrawn by the outward movement of the face plate, they move in unison, the train $q$ moving to the right, as the projections $c^3$ pass $q^1$, then to the left, as the projections $c^4$ pass $q^2$; and the projection $c^2$ impinges on the incline $n^4$ lifting up the bar $n$, the spring hook F aiding and holding the same in position. The extremity $c^5$ plays in a square hole in the base plate to prevent turning.

$c^6$ are pins that serve to prevent the keys $c$ being left too far out by the face plate; pins $b^6$ being in keys $b$ for the same purpose.

The movement of the party keys will be described with reference to Figs. 18, 19 and 20. In these views the base plate is not shown, the mechanism and its allied parts being in space. The bars $l$ are in horizontal position on the rear of the base-plate. (See Fig. 3.) There is one bar for each party row. When a party key $d$ is actuated, its surface $d^3$, (Fig. 20) impinges on the incline $l^1$, carrying the bar $l$ to the right. This bar contains openings $l^3$ through which the hooks F extend, permitting a movement of the hooks in a transverse direction to the bar. The hooks F are normally held to the left of the star wheels G (Fig. 20), and upon the actuation of a party key $d$, the bar $l$ carries the hooks with it, such that they are in alinement with the star wheels G, illustrated by $F^1$ (Fig. 20), and upon the outward movement of the face plate, the corresponding row of counting mechanisms are moved. It is evident that should any single candidate key have been actuated, previous to the swinging of the gate, the hooks F, corresponding to the single candidate group would have been thrown out of operative relation with the star wheels, while in a multi-candidate group, the single hook F, corresponding to the actuated key, would be out of operative relation with its star wheel.

The party keys are interlocked by the train of blocks $u$ which are similar in movement to the train $i$, described. This train $u$ has for its upper extremity the projection $u^2$ (Fig. 38) and when the train is lifted by the actuation of a party key the projection $u^2$ lifts the coupling dog $M^3$, which dog swings on the pivot $M^4$, and upon being lifted, the lug $M^5$, is cleared, thus admitting of the travel of M, which will permit the gate to be swung. See Fig. 42.

Should the voter desire to withdraw a party key, after having actuated the same, he can do so prior to the swinging of the gate. When the key $d$ is withdrawn, the surface $d^4$ impinges on the incline $l^2$, carrying the bar $l$ to normal position, taking with it, all hooks F, from operative relation with their star wheels. When the key $d$ is being withdrawn by the face plate, the dwell $d^5$ affords time for the hooks F to move the star wheel, before they are withdrawn from operative relation, by the impingement of $d^4$ on $l^2$.

In addition to the above described function, the bars $l$ operate the question mechanism. The right extremity of these bars operates a crank $w$. This crank swings on a pivot $w^1$, which pivot stands in the bed plate. The short arm of this crank is coupled to the bar $l$ by means of a pin which plays in an opening $l^4$, slightly elongated vertically to permit of the necessary play in that direction consequent to the circular movement of the crank arm. The movement of the bar $l$, thus causes the long arm of the crank to lift and the extremity resting between the lugs $x^1$ and $x^2$, causes the vertical bar $x$ to travel upward. This bar $x$ is provided with the levers $x^3$, pivoted at $x^5$, and fitted into the clearance $x^4$. They can be moved either to the right or the left, until in contact with the shoulder $x^6$. In arranging the machine for use, these levers are left vertical, if no party action is taken on the question, or if the question is acted upon, the lever is thrown to the right or left, accordingly.

G' are the star wheels of the counting mechanisms, similar in all respects to the regular star wheels and counters.

F' are the spring hooks for the questions keys, similar in all respects to the regular hooks F. When in normal position, these hooks are out of operative relation with the star wheels G', and as the bar $x$ moves upward, its levers $x^3$ force the hook F' into operative relation, as seen in F' 1 (Fig. 20). The star wheels are then operated upon the outward movement of the face plate. It is seen if the lever $x^3$ is left in a vertical position, neither of the hooks F' corresponding to that question will be put in operative relation.

It is to be understood, there is a bar $x$ corresponding to each horizontal bar $l$, and that each bar $x$ has but one set of the lugs $x^1$ and $x^2$. These bars $x$ play one on the top of the other as shown at $x$, $x'$, $x''$, Fig. 20. This necessitates variation in the length of the crank pivot arm $w^1$, such that the short arms move in the same plane, while the long arms move in different planes. Should the voter withdraw an actuated party key, thus returning the bar $l$ to normal position, the same operation restores the crank $w$ to normal, while its long arm, impinges on the lug $x^2$, returning the bar $x$ to normal, which in turn restores the hooks $F'$ to normal.

The operation of the questions keys will be described by reference to Figs. 35, 36 and 37. In these views the base plate is not shown, only the parts of this mechanism in relative position. Three keys and two counters constitute a question group. The two keys $h$ in horizontal relation, vote "yes", or "no," operating the star wheels directly, like the ordinary candidate keys described. The third key $h^1$ in the group is a revoke key, and operates no counter. There is no interlocking mechanism between these questions groups, but a series of blocks $v$, which are not in train, and move independently. When a voter actuates a key $h$, its projection $h^5$ impinges on the incline $v^1$, forcing the block $v$ downward. When block $v$ is thus down, the adjacent key $h$, can not be actuated since its projection $h^4$ would prevent. As block $v$ moves downward it carries with it the spring hooks $F'$, such that should they be placed in the same plane as their star wheels, by movement of a party key, they will be out of operative relation, with the star wheels upon the subsequent outward movement of the face plate. Through this construction, the voter may use the party key jointly with the question key, in voting, in which he can actuate a question key that will reverse the action, or revoke any action, by use of the key $h'$, which upon actuation moves the block $v$, in a manner similar to that described by the impingement of its projection $h'^5$ on the incline surface $v$ 3. Upon the withdrawal of a key $h$, either by the voter or the face plate, the projection $h^4$ lifts the block $v$, which is assisted and retained in position by the spring hooks $F'$. Fig. 37 is a vertical bar similar in position and movement to the bar N, described. In fact, bar P, is but a double bar N, serving to lift the key extremity $h^2$ out of operative relation to prevent their being reversed upon the outward movement of the face plate. The extremities of this bar P are similar to those of N. The bar P rests on top of the bars $x, x', x''$, serving to hold them in position, the base plate, being cut away for the placing of these bars $x, x', x''$.

The blank keys $g$ are described with reference to Figs. 28, 29 and 30. Fig. 28 being a view, in normal position, Fig. 30, a view in operated position. The keys $g$, are similar in every respect to the keys $a$, and have in addition, a pin $g^8$, fastened rigidly in the key. When the key is actuated, this pin $g^8$ impinges on the rack $y$, forcing it down as shown in Fig. 30. Projections on this key, impinge on the block $i$ and the bar $k$, similar to that of the keys $a$, described. With the exceptions of operating star wheels, keys $g$ perform no other functions.

Fig. 29 shows parts of the face plate broken away for illustration, no base plate being shown. The face plate $E'$ is flush with E, when this latter plate is in normal position. Face plate $E'$, remains stationary, at all times, only the face plate E operating. The space X is divided into compartments by means of vertical partitions, such that a compartment corresponds to each "blank" key. $E'^1$ is an aperture and $E'^2$, a chute adjacent to the aperture. The lower end of this chute is normally closed by the piece $y^1$. This piece $y^1$ is rigidly attached to the rack $y$, and plays in a slot $y^3$. The rack thus hinges at the slot $y^3$ while at rest, or traveling through the same. In Fig. 28 rack $y$ is in normal position. If the key $g$ is actuated, the pin $g^8$ carries the rack in contact with the pinion $K^4$, such that when the shaft K is operated through the swinging of the gate C, the rack travels upward, as shown in Fig. 30, thus leaving the chute $E^2$ open. $D^9$ is a horizontal strip fixed rigidly to the base plate, admitting of the passage of the upper extremity of the rack $y$, back of it, when the rack travels up. (Fig. 30). When the shaft K reverses upon closing the gate C, the rack is held in contact with its pinion by $D^9$, until it has returned to normal position, and been drawn out of contact, by means of the spring $y^2$. This same piece $D^9$ prevents the rack being improperly forced up in order to open the chute $E'^2$. Should the voter withdraw the key $g$, after having actuated the same, the rack $y$ is lifted out of contact with its pinion by the spring $y^2$.

From the foregoing it is obvious that should a voter actuate a key $g$ and place anything free to move by gravity in the chute, it would not pass into the receptacle X, until the gate C, had been swung; and for the same reason, he could remove a ballot so placed, prior to the swinging of gate C. There can be placed in the chute any suitable form of capsule, or more preferably, the ballot as shown in Figs. 26 and 27. This form consists of a slip of paper having a small stem, attached at one end, which serves to roll the slip on, while the other is gummed, in order that it may be sealed after rolling, to prevent the same becoming unrolled, and for secrecy. Such a roll fits into the chute, with sufficient clearance to fall by gravity; and owing to its size, prevents the placing of more than one roll in the same chute.

The "blank" keys $g'$ in multi-candidate groups, are provided with an additional interlocking horizontal bar $j$, as shown in Figs. 31 and 32. In each group there is such a bar $j$, which locks all keys $g'$ excepting one which will be called an initial key $g''$. This initial key has a side projection $g''^5$, which during the actuation of $g''$, impinges on the incline $j^1$, forcing the bar $j$ to the right. When this bar has moved to the right the shoulders $j^2$ are moved beyond interference of the projections $g'^5$, such that any key $g'$, may be actuated. When the bar $j$ is in normal position it interferes with the passing of the projections $g'^5$. When $g''$ is withdrawn, its projection $g'''^9$ impinges on the incline $j^3$, forcing it back to normal position.

In conjunction with the keys $g'$, may be used a coupon form of ballot blank as shown in Fig. 34. This is merely a multiple form of that shown in Fig. 26, excepting the strips of paper are attached to the same stem, as shown on the left, this common stem being only for convenience in form. In using this coupon form, the voter will write the name of a person, he wishes to be substituted on one of the strips, and when broken from the main stem, can be rolled on its portion of the stem, and prepared for insertion into the chute, below the initial key $g''$. Any additional names can be substituted by use of the remaining coupons, and placed in chutes under keys $g'$ in the same group. From this, it is apparent, should the voter write the same name on a coupon of the same original coupon form, as "A", it could be detected when the receptacles were opened, since there would be no duplicate forms of coupons issued, and in consequence, the same name, on two or more "A" forms, would be evidence of improper voting. To avoid the use of an additional coupon form, as "B", by the voter, in which he would place an "A" form in the chute under the initial key, and a "B" form in another chute, it would be understood, that no coupon found in $g'$ key receptacles would be acceptable, unless a coupon of the same letter-form was found in the receptacle of the initial key $g''$ of that group.

The presidential elector keys $e$, Figs. 23, 24, 25, are similar in construction and movement to the candidate keys $a$ having the same interlocking train of blocks $i$, and the bar $k$, performing the same functions, and operating corresponding counters. These keys $e$ have in addition a pin $e^8$, located in the same relation to the key $e$, as is the pin $g^8$, to key $g$, excepting $e^8$ is in the under side of the key, while $g^8$ is on the left face of the key. The rack and pinion device for the keys $e$ is similar to that of the keys $g$, described, excepting the $e$ key racks play on pinions on a vertical shaft, while the $g$ key racks play on pinions on a horizontal shaft. No description of the working of these racks is necessary. It is understood the face plate $E''$ is always fixed, and in all respects, similar to $E'$, the movable part of the face plate being E. The apertures $E''^1$ are similar to those described as $E'^1$, while the chutes $E''^2$ serve a purpose similar to those described as $E'^{2x}$. These keys $e$ have the hooks F, as described for keys $g$, which hooks are controlled by the left extremity of the bars $l$, as seen in Fig. 19. The receptacle for ballots placed in chutes $E''^2$ are shown as $X'^1$, $X'^2$, $X'^3$, (Fig. 25) with individual doors, $X'^5$, as shown at the lower ends of these receptacles. These individual doors $X^5$ slide vertically in guides at their side edges and consequently can be raised and thus opened when the main door is open and out of the way.

The ballot slips printed for use in electoral groups "scratching" are shown in Fig. 26, meaning Jones is to be replaced by Brown. This slip is then prepared and placed in an aperture corresponding to a group key, in which group Jones' name is found. By this arrangement, the count of the majority in the elector group is registered on the counter, and the exceptions when noted, are deducted from the count, for the individual elector in question. It follows, these ballot slips can be of sufficient length to permit the substitution of a plurality of names, for those indicated in the groups.

The mechanism operating upon the swinging of the machine gate C, will be described in detail with reference to Fig. 42. In this view, a front elevation, is shown the base plate D, with the various shafts, playing in boxing fixed on the base plate. H is the vertical shaft which serves as the axis for the gate C, the gate being wicket shaped and adjusted to the extremes of the shaft H. The upper and lower boxing supporting shaft H are shown at $H^1$, with suitable collars to hold the shaft in position. $H^2$ is a miter-wheel meshing with the mutilated miter wheel $K^2$, which serves to turn the shaft K, which shaft plays in boxings $K^1$. Shaft K carries the mutilated miter wheel $K^3$ which meshes in miter wheel $L^2$, serving to turn the vertical shaft L, playing in the boxing $L^1$. The gate shaft H carries the miter wheel $H^3$ which meshes in the mutilated miter-wheel $J^2$, serving to turn the shaft J, playing in the boxing $J^1$.

The mutilation of the miter wheels is for the sake of clearance, since the wheels make no complete revolution. The shaft H, carries the pinion $H^4$, which meshes with the rack on the bar M. Shaft H also carries the crank $R^1$ of the full stroke device R.

From the foregoing it can be seen upon the outward swing of the machine gate, the rack M must travel to the left, and unless the bar M, $M^1$, has been released, as described, the gate can not be swung; that the shaft J, revolves rightward, carrying with it the pinions $J^3$ and the dogs $J^4$, which pinions $J^3$ mesh in the racks $E^3$ (Fig. 43) causing the outward movement of the face plate, and which dogs J⁴, lift, permitting bars N (Fig. 3) and P (Fig. 37), to rise as described; that the shaft K revolves leftward, carrying with it the pinions K⁴ and K⁴′, which pinions K⁴ mesh in the racks $y$, (Fig. 30) as described, and which pinions K⁴′ mesh in the racks E⁴ (Fig. 43) carrying the face plate outward; and in addition the shaft K, causes the vertical shaft L to revolve rightward carrying with it the pinions L³ which mesh in the rack $y'$ (Fig. 24) as described. The gate swings through an arc of 90°, transmitting the same extent of movement to the shafts, which shafts reverse in the movement described upon the closing of the gate.

The full stroke device controlling the swinging of the gate is described in detail with reference to Figs. 47, 48, and 49, Fig. 47 being a front elevation, Fig. 48, a top view, and Fig. 49 a sectional view of the clutch cam in operation. When the gate swings outward, the shaft H swings with it the crank R¹, which through the connecting rod R², pivoted at R⁴ and R⁵, transmits motion to the bar R³, playing through guides R⁶, fixed in the base plate. This bar R³ carries a clutch cam R⁷, which swings freely on its pivot. A piece R⁸ is fastened to the bed plate in position such that the cam R⁷ slides along its top upon movement of the bar R³. The length of the piece R⁸ determines the necessary swing of the gate before its movement can be reversed. In Fig. 49 the gate is being opened, causing the bar R³ to move toward the right. If it is attempted to reverse the movement of the bar R³ at such a point, the cam grips and holds the bar. Not until the cam has cleared the right extremity of the piece R⁸ can it swing to the position opposite that shown and permit of the travel to the left. It is obvious that having moved part way over the piece R⁸ to the left, which direction it travels when the gate is being closed, that a reversal of this movement could not be accomplished until the cam had cleared the left extremity of the piece R⁸, and in which instance the gate will be closed. If the edge of the cam and piece R⁸ are knurled, there is less chance of the cam slipping, and failing to catch the reversal of the gate, until sufficiently actuated in either direction.

The provision for adjusting the machine for the use of a "limited" voter is described in detail with reference to Figs. 38, 39, 40 and 41. This term "limited" voter as used in this specification and in this art generally, has reference to one who is constitutionally debarred from a full use of the voter's franchise, though entitled to vote for candidates for certain offices, or questions, etc. For such a voter the machine must be adjustable to admit of his rights.

Z is a key accessible only in the rear of the machine, designed to be actuated by the election supervisor when it is necessary to adjust the machine for a "limited" voter. This key is drawn in the process of actuation, after which it can not be pushed in, thus preventing the machine from being readjusted until those keys permissible for a "limited" vote are actuated and the gate has been swung. The actuation of the machine gate readjusts the machine, thus preventing the possibility of a succeeding voter being limited in his franchise. The key Z extends through the face plate and terminates in the head Z¹, over which is fixed on the face plate a thimble E⁷. This thimble prevents the manipulation of the key from the front of the machine, yet permitting the face plate to reset the key in its outward movement. This key is in the "party" group, and when actuated its projection Z⁵ interferes with the lifting of the train of blocks $u$, thereby locking all party keys $d$ against actuation. When Z is in normal position, the clearance Z⁴ admits of the movement of the train $u$.

$z$ and $z'$ are horizontally movable bars resting in suitable supports. The bar $z$ contains notches $z^1$ to provide for clearance of the pins N⁶, which pins are inserted in such bars N, as desired in the arrangement for "limited" voting. When in normal position, the bar $z$, does not interfere with the lifting of bars N, while if bar $z$ is shifted until the clearance $z^1$ is out of position, bars N containing a pin N⁶ will be held down and such candidate keys that may have been actuated in such columns, will be held in contact with their star wheels, causing a reversal of movement, upon the swing of the gate, thus revoking a count that may have been advanced on the counter see Figs 38, 39 and 40. The bar $z'$ rests just back of the vertical bars $k$ into which bar $k$ may be inserted pins $k^3$ into such candidate columns for which the "limited" voter is not entitled to select candidates. If $z'$ is shifted to the left, its incline $z'^1$ impinges on the pins $k^3$ forcing such bars $k$ down, and clearing the dogs M⁶, permitting bar M to travel so far as such bars $k$, that have had pins inserted are concerned. From this it is seen the "limited" voter must complete the vote to which he is entitled, else all the dogs M⁶ will not be cleared, so preventing the swinging of the gate with an incomplete "limited" vote.

The projections Z⁶ and Z⁸ impinge on corresponding inclines on bars $z'$ and $z$, thus carrying them to the left when the key Z is actuated. When the face plate moves outward, the projections Z⁷ and Z⁹, restore the same bars to normal positions by impinging on the corresponding inclines. Such dwells as $z^{10}$ permit the bars $z$ and $z'$ to remain at rest during part of the travel of key Z, incident to the movement of the face plate.

By means of the link $Z^2$ which plays in the slot $Z^{11}$, the key can be pulled, but not returned.

In the case of a multi-indorsed candidate in a multi-candidate group, provision is made to prevent a duplicate vote being cast. The construction for this purpose is described with reference to Figs. 32 and 33. Assume the hooks F (Fig. 33) correspond to two keys allotted one in each of two parties to the same candidate. These hooks will be coupled by a bar $F''$, such that should one hook F, be forced down, the coupled hooks, will move in unison. The method of procedure is to insert a pin through the stem of one of the keys $g$ on the outside of the face plate E such that it can not be actuated, with instruction to the voter that the other key, in the couple, is to be actuated instead. In this instance it is seen the corresponding counters are subject to the action of the party-key, excepting of course where the actuation of a key $g$ has placed the hook F out of operative relation with the star wheel.

Figs. 54, 55, 56 and 57, illustrate in detail a means for locking the rear door of the machine for preventing access to the counters. $Y'$ is the upper part of the casing on the rear, and serves as a jamb for the door S, which swings out and down, on an axis fixed to Y, the lower part of the casing not shown. V is a mutilated wheel which is made to revolve by means of a key inserted in the slot at its center, until the wheel is in position to permit the door being opened as seen in Fig. 57. The door is shown as locked in Figs. 54 and 55. The wheel V is provided with teeth on its periphery $V^2$, which teeth mesh into the pinion $V'$, which pinion is covered by the shield form of hasp $V''$, fixed to the jamb $Y'$. This shield $V''$ is to protect the pinion $V'$ from being manipulated improperly when the door S is open. It covers the pinion $V'$ so that when the door is open no one can grasp it with their fingers and turn it to withdraw the plunger $V'^1$. The pinion $V'$ plays on the threaded end of the bar $V'^1$, which bar is thus moved horizontally, playing through a square eye in the guide $V'^6$ fixed to the base plate. The construction is such that when the wheel V is revolved to the point where the door can be opened, it has turned the pinion $V'$, causing it to send the bar $V'^1$ forward such that its extremity $V'^4$ extends over the dog $J^{4'}$ as seen in Fig. 56, such that the shaft J, can not be revolved. Owing to this, the machine gate can not be swung while the rear door is open, nor can the bars N be released, so as to free the star wheels from the key extremities $a^2$, both of which constructions serve to prevent the manipulation of the counters. Should the gate be open, the dog $J^{4'}$ is in a position to prevent the movement of the bar $V'^1$, which would in turn check the unlocking of the door. From the foregoing, it is seen that the door must be locked to permit of the operation of the machine, and that the unlocking of the door locks the counters from manipulation. In order to manipulate the counters, resort must be had to a "master" key $V'^5$, which when inserted into its key-hole, can be used to revolve the pinion $V'$ for returning the bar $V'^1$ to normal. The construction is such that the machine can not be locked after the use of the "master" key unless the bar $V'^1$ was previously returned to the position where it locks the machine as described. Nor can the master key be used while the machine door is locked, as seen by the construction see particularly Figs. 3 and 55. W is a form of dog which serves to prevent the turning of the wheel V, as seen in Fig. 54. Only when the dog W has been released, as seen in Fig. 57, can the door be locked or unlocked. The movement relating to bar W will be described later.

The construction of the rear door mechanism is such that upon closing it and rendering the machine operative for use of a voter, an impression of the type-faced numerals on the counters will be taken by means of printing, in conjunction with the common form of carbon paper, the impression being made upon a tally sheet placed in position for the purpose. When the door is opened another printing process takes place similar to the closing, in which the tally sheet has been shifted such that the second record is printed, in alinement and just above the previously printed record. It is obvious, the difference in the records is the number of times the counter has been operated between the closing and the opening of the door. There is provided a counter for registering the number of times the door is actuated, which record is printed in a manner similar to that described; also a seal, or form of signature together with the machine number, such that each tally sheet when delivered to a central office can be identified. The type faces referred to will have milled edges or puncture points, such that the records are cut in the paper, to avoid any possible erasures or changes. The mechanism providing for this construction will be described in detail with reference to Figs. 50, 51, 52 and 53. Fig. 50 is the front elevation, Fig. 51 a plan view, Fig. 52, a side view, and Fig. 53 a detail in operated position. The door S swings on the axis $S^6$, which axis is fixed to the lower jamb Y, the door swinging out and down from the upper jamb $Y'$. On the inside of the door rests the wall $S'$, movable vertically, which carries the tally sheet, and carbon paper, for taking the counter impressions. T are vertical cams resting on the outside of the door, the extremities $T^1$ terminating in cylindrical form, the lower extremities being supported by projecting pieces $Y^1$, with holes $Y^2$, in which T plays. The upper extremities of T, enter the sockets $Y'^1$, when T is operated, thus securing the door. The cams T have fixed on them the spiral gears $T^3$ near the lower extremity and the thread $T^4$ near the upper extremity. The cams are held by the guide loops $S^3$, fixed to the door, which loops admit movement of the door to and from the cams axis. When the cams are made to revolve the door is forced inward, while the reversing of the cams reverses the movement of the door by means of the loops $S^3$. $S^1$ is a form of hasp fixed to the door S, and having the surface $S^2$. As cam T revolves the thread $T^4$ moves on the surface $S^2$, such that the cam T, is raised into the sockets $Y'^1$. The construction is such that the first part of the revolution of the cams causes them to lift into these sockets $Y'^1$, and yet have the lower extremity $T^1$, supported in $Y^2$, the thickness of $Y^1$, being sufficient, to permit the necessary elevation of cams, without clearing the openings $Y^2$. After the cams have lifted, during the first quarter turn the thread $T^4$ dwells on its horizontal termination and the cam projections $T^2$, become effective, forcing the door inward, the cam being held in its sockets $Y'^1$ and $Y^2$. U is a horizontal shaft on the inner side of the door playing in the boxing $U^5$, fastened to the door. By means of the miter wheels $U^1$ and $S^4$, motion may be transmitted to the shaft U, by use of a wrench form of lever, that may be placed on the square end $S^5$, which end protrudes through the door for this purpose. Shaft U, carries spiral gears $U^2$, which mesh in the spiral gear $T^3$, clearance being made in the door for this purpose. Motion from the horizontal shaft U is thus transmitted to the vertical cam shafts T, and owing to the length of the spiral gears $T^3$, the motion is continued, as the cams T lift, the spiral gears being on the cam axis, meshing exists at all times between the spiral gears. The shaft U carries spiral cams $U^3$. These spirals work in relation to the eyes $S'^1$ which are fixed to the movable wall $S'$ described, such that the wall is moved in vertical directions. If motion is given to the spiral in a direction opposite the direction of clock hands as is done when the door is being closed, the spiral lifts up the wall $S'$, and as the spiral terminates in a circle form, there is a dwell, during which dwell the first printing of the counter records is made on the tally sheet. At the reverse movement of the spiral cam the eye $S'^1$ passes off the spiral cam on to the axis U, where it dwells during which dwell the second printing of the records is made. During the reverse movement of the spiral its end enters the clearance in the eye $S'^2$. In Fig. 52 the spiral is shown holding the wall $S'$ at its maximum height, for the first printing, being placed so for sake of illustration. The shaft U carries the wheel $U^4$, which wheel has a mutilation as shown at $U^6$, Fig. 53. This wheel $U^4$ controls the vertical bar W, to which reference has been made. Not until the extremity $W^2$ has seated in the clearance $U^6$, can the dog $W^1$ clear the wheel V, and permit its operation as previously described.

From the foregoing description it is obvious the movements incident to the operations of the door are as follows: The door is assumed to be unlocked in which instance the wheel V is as shown; the bar W resting on the outer edge of $U^4$, causes the dog $W^1$ to clutch the wheel V; the cam projections $T^2$ are turned farther to the left than shown, the door S resting against the cylindrical part $T^1$; the wall $S'$ held at its maximum height as shown; the upper extremities $T^1$, being out of the sockets $Y'^1$ as shown. Owing to the position of V, the bar $V'^1$, (Fig. 55) will have locked the machine as described. Before bar $V'^1$ can be withdrawn to render the machine operative, the wheel V must be actuated. Before the wheel V is actuated, the wheel $U^4$ must be made to have a nearly complete revolution, which movement must be given by shaft U. When shaft U revolves, the cams revolve, forcing the wall $S'$, against the type face, the revolution of the cams continuing until the wall is withdrawn leaving the counters clear. Had these operations been performed, the door would be locked, and the impressions taken from the counters, prior to the withdrawal of bar $V'^1$, which would leave the machine ready for the use of a voter. Before the counters can be exposed again, the shaft U must be reversed in order to free wheel V. When the shaft U is reversed the wall $S'$ rests on the axis U, during the first quarter turn, during which time the cams cause the wall to press against the type face, taking the second impression while the wall is lowered, which causes the second record to be above that of the first on the tally sheet; and during the last of the turn the extremities $T^1$, come out of their sockets $Y'^1$, after which the wheel $U^4$ is in position to allow the bar W to rest in the clearance $U^6$. When this has been done the door may be unlocked and swung on its axis, which axis plays in slotted hinges $S^7$ to admit of its described movements. Clearance $Y^3$ is made for the lower extremities $T^1$, to permit their movement in the swinging down of the door.

The counting mechanisms are fixed in vertical columns on a carrier such that the carriers can be easily arranged and fastened in position on the bed-plate. The counters are of the general form known as the Geneva stop transfer. Since the records are taken in printed form, the order of the wheels is reversed, placing units wheel on the end commonly used for hundreds, such that when printed, the numerals are in proper position. As stated, the numbers are in type form. The counters used in the construction here described are improved to permit of resetting with ease, and yet be locked when the star wheel is not cleared. They are described in detail with reference to Figs. 58, 59, 60, 61, 62, 63, 64 and 65. Fig. 66 showing how the counters are arranged on the carriers $G^1$. The drawings are double size.

The star wheels G and the general unit wheel 14, are fixed to the axis of the counter. The regular transfer mechanism is shown in Figs. 60 and 61. A spring disk washer 15 serves to hold the wheels 12 and 13 in position, to permit of the transfer.

Pins 16 and 17 are fixed in the counter axis. The clearance 18 permits the wheel 12 being forced to the right, in which position wheel 12 becomes locked to the axis. The clearance 19 permits the wheel 12 to revolve on the axis without interference by the pin 16. The clearance 20 in wheel 13 permits it being forced to the right over pin 16, in which position it becomes locked to the axis. If the counter is to be reset it is obvious the star wheel G must be free to move. The hundreds wheel 12 is forced to the right (Fig. 64) whereupon it turns with the star wheel, and may be moved to any position, such that its zero corresponds with the zero on the tens wheel 13. The two wheels 12 and 13 are now forced to the right in which position they move with the star wheel, and may be moved to any position desired. They are then moved back on the shaft until they are disengaged from the star wheel and are locked in the transfer mechanism and the star wheel carrying the units wheel 14 is then turned until the zero on that wheel corresponds with the zeros on the other wheels, all of the zeros being brought to the position desired in line. By such construction the wheels can be set to zeros, with two half turns of the star wheel; nor can they be reset unless the star wheels are free to move.

Having thus fully described my invention, what I claim as new and desire to secure by Letters Patent of the United States, is:—

1. A voting machine including counters, means for limiting the number of counters that may be operated by a voter, and a plurality of permanently attached means in front of said machine for operating any one of said counters.

2. In a device of the class described, counter mechanisms and corresponding counter actuating mechanisms, interlocking mechanism between the counter actuating mechanisms and additional permanently attached distinctly separate counter actuating mechanisms on the same side of the machine for the counter mechanisms.

3. In a device of the class described, counter mechanisms and corresponding counter actuating mechanisms, interlocking mechanism between the counter actuating mechanisms, and additional distinctly separate counter actuating mechanisms for the counter mechanisms, both sets of counter actuating mechanisms being permanently attached on the same side of said machine.

4. In a device of the class described, counter mechanisms, a plurality of distinctly separate permanently attached sets of counter actuating mechanisms on the same side of the machine, and interlocking mechanism between the several counter actuating mechanisms in each separate set.

5. In a device of the class described, a group of counter mechanisms corresponding to a specific office, each counter mechanism corresponding to a specific candidate for the office, corresponding counter actuating mechanisms, interlocking mechanism between said counter actuating mechanisms, and additional distinctly separate counter actuating mechanisms constituting a permanently attached part of said machine for the counter mechanisms, the said counter actuating mechanisms being on the same side of the machine.

6. In a device of the class described, a plurality of groups of counter mechanisms, each group corresponding to a specific office, each counter mechanism corresponding to a specific candidate for one of the offices, corresponding counter actuating mechanisms, interlocking mechanism in said groups between said counter actuating mechanisms, and additional distinctly separate permanently attached counter actuating mechanisms for the counter mechanisms, the said counter actuating mechanisms being on the same side of the machine.

7. In a device of the class described, counter mechanisms and corresponding counter actuating mechanisms, interlocking mechanisms between the counter actuating mechanisms, and additional distinctly separate permanently attached counter actuating mechanisms on the same side of the machine for the counter mechanisms, the mechanism being so constructed as to permit of simultaneous actuation of a plurality of counter mechanisms.

8. In a device of the class described, counter mechanisms, and corresponding counter actuating mechanisms, interlocking mechanisms between the counter actuating mechanisms, additional distinctly separate permanently attached counter actuating mechanisms on the same side of the machine for the counter mechanisms, and means for causing the simultaneous actuation of a group of counter mechanisms corresponding to candidates in a specific political party.

9. In a device of the class described, a plurality of groups of counter mechanisms, each group corresponding to a specific office, each counter mechanism corresponding to a specific candidate for one of the offices, corresponding counter actuating mechanisms, interlocking mechanism in said groups between said counter actuating mechanisms, mechanism for the actuation of a group of counter mechanisms corresponding to candidates in a specific political party, and means whereby any one counter actuating mechanism comprised in the aforesaid office groups may be actuated prior or subsequent to the actuation of the mechanism for the actuation of a group of counter mechanisms corresponding to candidates in a specific political party.

10. In a device of the class described, a plurality of groups of counter mechanisms, each group corresponding to a specific office, each counter mechanism corresponding to a specific candidate for one of the offices, corresponding counter actuating mechanisms, interlocking mechanism in said groups between said counter actuating mechanisms, mechanism for the actuation of a group of counter mechanisms corresponding to candidates in a specific political party, and means whereby the mechanism for the actuation of a group of counter mechanisms corresponding to candidates in a specific political party may be actuated prior or subsequent to the actuation of any one counter actuating mechanism comprised in the aforesaid office groups.

11. In a device of the class described, counter mechanisms including printing numerals and corresponding counter actuating mechanisms, interlocking mechanism between the counter actuating mechanisms, mechanism for taking the impression of numerals on the counter mechanisms, and means for preventing the actuation of any counter mechanism prior to the operation of the mechanism for taking the impression of the numerals.

12. In a device of the class described, counter mechanisms including printing numerals and corresponding counter actuating mechanisms, interlocking mechanism between the counter actuating mechanisms, mechanism for taking the impression of numerals on the counter mechanisms, and means for preventing actuations of any counter mechanism after said mechanism for taking the impression of the numerals has been actuated.

13. In a device of the class described, counter mechanisms including printing numerals and corresponding counter actuating mechanisms, interlocking mechanism between the counter actuating mechanisms, mechanism for taking the impression of numerals on the counter mechanisms, a door for preventing access to the counter mechanisms, means for fastening said door, and means whereby said fastening means and impression mechanism operate jointly.

14. In a device of the class described, counter mechanisms including printing numerals and corresponding counter actuating mechanisms, interlocking mechanism between the counter actuating mechanisms, mechanism for taking the impression of numerals on the counter mechanisms, and means for preventing the actuations of any counter mechanism prior to the operation of the mechanism for taking the impression of the numerals.

15. In a device of the class described, counter mechanisms including printing numerals and corresponding counter actuating mechanisms, interlocking mechanism between the counter actuating mechanisms, mechanism for taking the impression of numerals on the counter mechanisms, and means for preventing access to the counter mechanisms without operating the mechanism for taking an impression of the numerals.

16. In a device of the class described, counter mechanisms including printing numerals and corresponding counter actuating mechanisms, interlocking mechanism between the counter actuating mechanisms, mechanism for taking the impression of numerals on the counter mechanisms, releasable means for preventing access to said counter mechanisms, and means controlled by said releasable means for taking the impression of the numerals when said releasable means is fastened and when it is released.

17. In a device of the class described, a plurality of groups of counter mechanisms, each group corresponding to a specific office, each counter mechanism corresponding to a specific candidate for one of the offices, corresponding counter actuating mechanisms and interlocking mechanism in said groups between said counter actuating mechanisms, a plurality of mechanisms each for the actuation of a group of counter mechanisms corresponding to candidates in a specific political party, an additional counter mechanism for recording the total vote on a question, and means whereby the actuation of either one of a plurality of mechanisms for the actuation of a group of counter mechanisms corresponding to candidates in a specific political party, will operate to actuate the said additional question recording counter mechanism.

18. In a device of the class described, a plurality of groups of counter mechanisms, each group corresponding to a specific office, each counter mechanism corresponding to a specific candidate for one of the offices, corresponding counter actuating mechanisms and interlocking mechanism in said groups between said counter actuating mechanisms, a plurality of mechanisms each for the actuation of a group of counter mechanisms corresponding to candidates in a specific political party, a plurality of additional counter mechanisms each for recording the total vote on one of a plurality of questions, and means whereby the actuation of either one of a plurality of mechanisms for the actuation of a group of counter mechanisms corresponding to candidates in a specific political party, will operate to actuate a plurality of said additional question counter mechanisms.

19. In a device of the class described, a plurality of groups of counter mechanisms, each group corresponding to a specific office, each counter mechanism corresponding to a specific candidate for one of the offices, corresponding counter actuating mechanisms and interlocking mechanism in said groups between said counter actuating mechanisms, a plurality of mechanisms each for the actuation of a group of counter mechanisms corresponding to candidates in a specific political party, a pair of additional counter mechanisms and corresponding counter actuating mechanisms, one of the said pair of counter mechanisms for recording the total affirmative vote on a question and the other counter mechanism for recording the total negative vote on the same question, means whereby the actuation of either one of the plurality of mechanisms for the actuation of a group of counter mechanisms corresponding to candidates in the specific political party will operate to actuate one of the said additional question counter mechanisms, and additional means whereby the actuation of the corresponding counter actuating mechanism of either one of the said pair of additional counter mechanisms will render inoperative said mechanism which operates to actuate one of the said additional counter mechanisms.

20. In a device of the class described, a plurality of groups of counter mechanisms, each group corresponding to a specific office, each counter mechanism corresponding to a specific candidate for one of the offices, corresponding counter actuating mechanisms and interlocking mechanism in said groups between said counter actuating mechanisms, a plurality of mechanisms each for the actuation of a group of counter mechanisms corresponding to candidates in a specific political party, a plurality of pairs of additional counter mechanisms and corresponding counter actuating mechanisms, one in each of the said pair of counter mechanisms for recording the total affirmative vote on a question and the other counter mechanism in each pair for recording the total negative vote on the same question, means whereby the actuation of either one of the plurality of mechanisms for the actuation of a group of counter mechanisms corresponding to candidates in the specific political party will operate to actuate one in each of the said pairs of additional question counter mechanisms, and additional means whereby the actuation of the counter actuating mechanism of either one of a pair of additional counter mechanisms will render inoperative said mechanism which operates to actuate one of the said pair of additional counter mechanisms.

21. In a device of the class described, a plurality of groups of counter mechanisms, each group corresponding to a specific office, each counter mechanism corresponding to a specific candidate for one of the offices, corresponding counter actuating mechanisms and interlocking mechanism in each group between said counter actuating mechanisms, a plurality of mechanisms each for the actuation of a group of counter mechanisms each group corresponding to candidates in a specific political party, and a pair of additional counter mechanisms and corresponding counter actuating mechanisms, the said pair of counter actuating mechanisms being provided with additional distinctly separate mechanism, one of the pair of counter mechanisms being for recording the total affirmative vote on a question and the other counter mechanism for recording a total negative vote on the same question, and means whereby the actuation of either one of the plurality of mechanisms for the actuation of a group of counter mechanisms corresponding to candidates in a specific political party will operate to actuate one of the said additional question counter mechanisms, and means whereby the actuation of the aforesaid additional distinctly separate mechanism of the said pair of additional question counter actuating mechanisms will render ineffective the action of a mechanism for the actuation of a group of counter mechanisms corresponding to candidates in a specific political party on the aforesaid question counter mechanism.

22. In a device of the class described, a plurality of groups of counter mechanisms, each group corresponding to a specific office, each counter mechanism corresponding to a specific candidate for one of the offices, corresponding counter actuating mechanisms and interlocking mechanism in said groups between said counter actuating mechanisms, a plurality of mechanisms, each for the actuation of a group of counter mechanisms corresponding to candidates in a specific political party, and a plurality of pairs of additional counter mechanisms and corresponding counter actuating mechanisms, each of the said pairs of counter actuating mechanisms being provided with additional distinctly separate mechanism, one of each pair of counter mechanisms being for recording the total affirmative vote on a question and the other counter mechanism for recording a total negative vote on the same question, and means whereby the actuation of either one of the plurality of mechanisms for the actuation of a group of counter mechanisms corresponding to candidates in a specific political party will operate to actuate one of the said additional question counter mechanisms in each of said groups, and means whereby the actuation of the aforesaid additional distinctly separate mechanism of either one of the said pairs of additional question counter actuating mechanisms will render ineffective the action of mechanism for the actuation of a group of counter mechanisms corresponding to candidates in a specific political party on the aforesaid question counter mechanisms.

23. In a device of the class described, counter mechanisms and corresponding counter actuating mechanisms, interlocking mechanism between the counter actuating mechanisms, mechanism for resetting an actuated counter actuating mechanism to normal position, and means preventing the actuation of said resetting mechanism until a counter actuating mechanism is in complete actuated position.

24. In a device of the class described, counter mechanisms and corresponding counter actuating mechanisms, interlocking mechanism between the counter actuating mechanisms, additional distinctly separate counter actuating mechanisms for the counter mechanisms, mechanism for resetting an actuated counter actuating mechanism to normal position, and means preventing the actuation of said resetting mechanism until a counter actuating mechanism is in complete actuated position.

25. In a device of the class described, a plurality of groups of counter mechanisms, each group corresponding to a specific office, each counter mechanism corresponding to a specific candidate for one of the offices, corresponding counter actuating mechanisms, interlocking mechanism in said groups between said counter actuating mechanisms, mechanism for resetting the actuated counter actuating mechanisms in normal position, and means preventing the actuation of said resetting mechanism until a counter actuating mechanism in each of the said groups is in complete actuated position.

26. In a device of the class described, a plurality of groups of counter mechanisms, each group corresponding to a specific office, each counter mechanism corresponding to a specific candidate for one of the offices, corresponding counter actuating mechanisms, interlocking mechanism in said groups between said counter actuating mechanisms, additional distinctly separate counter actuating mechanism for the counter mechanisms, mechanism for resetting the actuated counter actuating mechanisms in normal position, and means preventing the actuation of said resetting mechanism until a counter actuating mechanism in each of the said groups is in complete actuated position.

27. In a device of the class described, a plurality of groups of counter mechanisms, each group corresponding to a specific office, each counter mechanism corresponding to a specific candidate for one of the offices, corresponding counter actuating mechanisms, and interlocking mechanism in said groups between said counter actuating mechanisms, additional distinctly separate counter actuating mechanism for the counter mechanisms, mechanism for limiting the number of said groups, in which counter mechanisms may be actuated by a voter, mechanism for resetting the actuated counter actuating mechanisms and for rendering inoperative said limiting mechanism, means preventing the rendering of the said limiting mechanism inoperative except by the actuation of the mechanism for resetting the actuated counter actuating mechanisms, and means preventing the actuation of said resetting mechanism until a counter actuating mechanism in each of the groups that are not rendered inoperable by the limiting mechanism, is in complete actuated position.

28. In a device of the class described, a plurality of groups of counter mechanisms, each group corresponding to a specific office, each counter mechanism corresponding to a specific candidate for one of the offices, corresponding counter actuating mechanisms, and interlocking mechanism in said groups between said counter actuating mechanisms, mechanism for limiting the number of said groups in which counter mechanisms may be actuated by a voter, mechanism for resetting the actuated counter actuating mechanisms and for rendering inoperative said limiting mechanism, means preventing the rendering of the said limiting mechanism inoperative except by the actuation of the mechanism for resetting the actuated counter actuating mechanisms, and means preventing the actuation of said resetting mechanism until a counter actuating mechanism in each of the groups that are not rendered inoperable by the limiting mechanism, is in complete actuated position.

29. A group of counter mechanisms corresponding to a specific office for which a predetermined plurality of candidates are to be selected, corresponding counter actuating mechanisms, additional mechanism for limiting the number of counter actuating mechanisms that may be actuated to that of the predetermined plurality of candidates to be selected, additional release mechanisms equal in number to the number of candidates to be selected, and means preventing the actuation of a counter actuating mechanism before the actuation of said additional release mechanism.

30. A group of counter mechanisms corresponding to a specific office for which a predetermined plurality of candidates are to be selected, corresponding counter actuating mechanisms, additional mechanism for limiting the number of counter actuating mechanisms that may be actuated to that of the predetermined plurality of candidates to be selected, additional release mechanisms equal in number to the number of candidates to be selected, means preventing the actuation of a counter actuating mechanism before the actuation of said additional release mechanism, and means for preventing the restoring of said additional release mechanism to normal after actuation.

31. In a device of the class described, counter mechanisms and corresponding counter actuating mechanisms, interlocking mechanism between the counter actuating mechanisms, the parts of said counter actuating mechanisms accessible to the voter being so constructed as to receive and hold labels, the mechanical arrangement of the holding means for each accessible part being different from other accessible parts, whereby the labels for the different accessible parts must be different mechanically.

32. In a device of the class described, counter mechanisms and corresponding counter actuating mechanisms, said mechanisms arranged in specific office groups and specific party groups, interlocking mechanism in said office groups between the counter actuating mechanisms, means for holding labels designating the associated counter mechanisms, the holding means being so constructed that labels corresponding to a specific party group can only be adjusted to the holding means for said party group.

33. In a device of the class described, counter mechanisms and corresponding counter actuating mechanisms, said mechanisms arranged in specific office groups and specific party groups, interlocking mechanism in said office groups between the counter actuating mechanisms, means for holding labels designating the associated counter mechanisms, the holding means being so constructed that labels corresponding to a specific office group can only be adjusted to the holding means for said office group.

34. In a device of the class described, a plurality of groups of counter mechanisms each group corresponding to a specific office, each counter mechanism corresponding to a specific candidate for one of the offices, corresponding counter actuating mechanisms, and interlocking mechanism in said groups between said counter actuating mechanisms, additional distinctly separate counter actuating mechanism for the counter mechanisms, mechanism limiting the number of said groups in which counter mechanisms may be actuated by a voter, and additional mechanism for resetting the actuated counter actuating mechanisms and for rendering inoperative said limiting mechanism.

35. In a device of the class described, a plurality of groups of counter mechanisms, each group corresponding to a specific office, each counter mechanism corresponding to a specific candidate for one of the offices, corresponding counter actuating mechanisms, and interlocking mechanism in said groups between said counter actuating mechanisms, mechanism limiting the number of said groups in which counter mechanisms may be actuated by a voter, and additional mechanism for resetting the actuated counter actuating mechanisms and for rendering inoperative said limiting mechanism.

36. In a device of the class described, a plurality of groups of counter mechanisms, each group corresponding to a specific office, each counter mechanism corresponding to a specific candidate for one of the offices, corresponding counter actuating mechanisms, and interlocking mechanism in said groups between said counter actuating mechanisms, additional distinctly separate counter actuating mechanism for the counter mechanisms, mechanism for limiting the number of said groups in which counter mechanisms may be actuated by a voter, mechanism for resetting the actuated counter actuating mechanisms and for rendering inoperative said limiting mechanism, and means preventing the rendering of the said limiting mechanism inoperative except by the actuation of the mechanism for resetting the actuated counter actuating mechanisms.

37. In a device of the class described, a plurality of groups of counter mechanisms, each group corresponding to a specific office, each counter mechanism corresponding to a specific candidate for one of the offices, corresponding counter actuating mechanisms, and interlocking mechanism in said groups between said counter actuating mechanisms, mechanism for limiting the number of said groups in which counter mechanisms may be actuated by a voter, mechanism for resetting the actuated counter actuating mechanisms, and for rendering inoperative said limiting mechanism, and means preventing the rendering of the said limiting mechanism inoperative except by the actuation of the mechanism for resetting the actuated counter actuating mechanisms.

38. In a device of the class described, a plurality of groups of counter mechanisms, each group corresponding to a specific office, each counter mechanism corresponding to a specific candidate for one of the offices, corresponding counter actuating mechanisms and interlocking mechanism in said groups between said counter actuating mechanisms, a plurality of mechanisms each for the actuation of a group of counter mechanisms corresponding to candidates in a specific political party, and means whereby an actuated mechanism, for the actuation of a group of counter mechanisms corresponding to candidates in a specific political party, can be restored to normal by the voter so that any of the said mechanisms can be actuated.

39. In a voting machine, the combination of a party key, a candidate counting mechanism operable by said party key, additional means for operating said counting mechanism, connections whereby one of said means operates by direct action and whereby the other operates by delayed action.

40. In a voting machine, the combination of a party key, a plurality of candidate counting mechanisms operable by said party key, additional means for operating said counting mechanisms, connections whereby one of said means operates by direct action, and whereby the other operates by delayed action.

41. In a voting machine, the combination of keys composing a party group, condidate counting mechanisms operable by said keys, additional means for operating said counting mechanisms, connections whereby one of said means, operates by direct action and whereby the other operates by delayed action.

42. In a voting machine, the combination of keys composing a party group, a plurality of candidate counting mechanisms operable by said keys, additional means for operating said counting mechanism, and connections whereby one of said means operates by direct action and whereby the other operates by delayed action.

43. In a device of the class described, a group of counter mechanisms corresponding to a specific political party, each counter mechanism corresponding to a specific candidate in said party, an additional counter mechanism corresponding to the same party but not corresponding to a particular candidate, corresponding counter actuating mechanisms, means controlled by the actuating mechanism for the said additional counter mechanism for indicating a selection not among the particular candidates, and means whereby an actuated additional counter actuating mechanism can be restored to normal by the voter so that any of the said mechanisms can be actuated.

44. In a device of the class described, a group of counter mechanisms corresponding to a specific political party, each counter mechanism corresponding to a specific candidate in said party, corresponding counter actuating mechanisms, an additional mechanism corresponding to the same party but not corresponding to a particular candidate, means controlled by the said additional mechanism for indicating a selection not among the specific candidates, and means whereby an actuated additional mechanism can be restored to normal by the voters so that any of the said mechanisms can be actuated.

45. In a device of the class described, the combination with counter actuating mechanism of a counter mechanism comprising units, tens and hundreds wheels on a common axis with suitable transfer mechanism between said wheels, the structure being such that the wheels may be disconnected from said transfer mechanism, and means fixing said wheels when so disconnected to said common axis.

46. In a device of the class described, the combination of a counter actuating mechanism, a counter mechanism comprising a plurality of wheels on a common axis with suitable interlocking transfer mechanism between said wheels, means for disconnecting said wheels from said transfer mechanism, and means for locking any or all of said wheels to the common axis when disconnected from said transfer mechanism, thus preventing the turning of said wheels when said axis is locked.

In testimony whereof I have hereunto signed my name in the presence of two subscribing witnesses.

CHARLES C. MOORE, JR.

Witnesses:
JOSEPH L. ATKINS,
M. H. YATES.